(12) United States Patent
Fleming et al.

(10) Patent No.: US 8,352,488 B2
(45) Date of Patent: Jan. 8, 2013

(54) METHODS, SYSTEMS AND COMPUTER PROGRAM PRODUCTS FOR PROVIDING A DISTRIBUTED ASSOCIATIVE MEMORY BASE

(75) Inventors: James S. Fleming, Apex, NC (US); Yen-min Huang, Cary, NC (US)

(73) Assignee: Saffron Technology, Inc., Morrisville, NC (US)

(*) Notice: Subject to any disclaimer, the term of this patent is extended or adjusted under 35 U.S.C. 154(b) by 270 days.

(21) Appl. No.: 12/775,539

(22) Filed: May 7, 2010

(65) Prior Publication Data

US 2010/0306227 A1    Dec. 2, 2010

Related U.S. Application Data

(60) Provisional application No. 61/176,282, filed on Jun. 2, 2009.

(51) Int. Cl.
*G06F 7/00* (2006.01)
*G06F 17/30* (2006.01)

(52) U.S. Cl. .................................. 707/768; 717/108

(58) Field of Classification Search .................. 707/763
See application file for complete search history.

(56) References Cited

U.S. PATENT DOCUMENTS

| | | | |
|---|---|---|---|
| 6,369,855 B1 * | 4/2002 | Chauvel et al. | 348/423.1 |
| 6,581,048 B1 * | 6/2003 | Werbos | 706/23 |
| 6,745,280 B2 * | 6/2004 | Darnell et al. | 711/108 |
| 7,333,917 B2 * | 2/2008 | Greis et al. | 702/183 |
| 7,383,255 B2 * | 6/2008 | Desai et al. | 707/763 |
| 7,899,975 B2 * | 3/2011 | Driehorn et al. | 711/103 |
| 7,899,976 B2 * | 3/2011 | Pandya | 711/103 |
| 2003/0188090 A1 * | 10/2003 | Darnell et al. | 711/108 |
| 2006/0095653 A1 * | 5/2006 | Fleming et al. | 711/108 |
| 2006/0136659 A1 * | 6/2006 | Jain et al. | 711/108 |
| 2006/0143373 A1 * | 6/2006 | Jain et al. | 711/108 |
| 2007/0271255 A1 | 11/2007 | Pappo | |
| 2008/0320042 A1 | 12/2008 | Arnold et al. | |

FOREIGN PATENT DOCUMENTS

WO    WO 2009/062063 A1    5/2009

OTHER PUBLICATIONS

International Search Report and Written Opinion of the International Searching Authority corresponding to International Application No. PCT/US2010/033952; Date of Mailing: Nov. 29, 2010; 9 pages.
International Preliminary Report on Patentability Corresponding to International Application No. PCT/US2010/033952; Date of Mailing: Dec. 15, 2011; 6 pages.

* cited by examiner

*Primary Examiner* — Binh V Ho
(74) *Attorney, Agent, or Firm* — Myers Bigel Sibley & Sajovec

(57) ABSTRACT

Systems, methods and computer program products are provided for a distributed associative memory base. Such methods may include providing a distributed memory base that includes a network of networks of associative memory networks. The memory base may include a network of associative memory networks, a respective associative memory network comprising associations among a respective observer entity and a plurality of observed entities that are observed by the respective observer entity. Ones of the associative memory networks are physically and/or logically independent from other ones of the associative memory networks. Methods include imagining associations from the associative memory base using a plurality of streaming queues that correspond to ones of a plurality of rows of ones of the associative memory networks.

29 Claims, 21 Drawing Sheets

METHODS, SYSTEMS AND COMPUTER PROGRAM PRODUCTS FOR PROVIDING A DISTRIBUTED ASSOCIATIVE MEMORY BASE

RELATED APPLICATIONS

This non-provisional patent application claims priority to U.S. Provisional Application Ser. No. 61/176,282, filed Jun. 2, 2009, the disclosure of which is hereby incorporated herein by reference as if set forth fully herein.

FIELD OF THE INVENTION

This invention relates to knowledge management systems, methods and computer program products, and more particularly to associative memory systems, methods and computer program products.

BACKGROUND

Associative memories, also referred to as content addressable memories, are widely used in the field of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled "Electronic Network for Collective Decision Based on Large Number of Connections Between Signals".

Although associative memories may avoid problems in prior back-propagation networks, associative memories may present problems of scaling and spurious memories. Recent improvements in associative memories have attempted to solve these and other problems. For example, U.S. Pat. No. 6,052,679 to coinventor Aparicio, IV et al., entitled "Artificial Neural Networks Including Boolean-Complete Compartments" provides a plurality of artificial neurons and a plurality of Boolean-complete compartments, a respective one of which couples a respective pair of artificial neurons. By providing Boolean-complete compartments, spurious complement memories can be avoided.

Unfortunately, there is a fundamental scaling problem that can limit the use of associative memories to solve real world problems. In particular, many associative memories scale geometrically as a function of the number of inputs. This geometric scaling may be unreasonable to support applications at the scale of geometric scaling may be unreasonable to support applications at the scale of complexity that warrants such technology. Scaling in associative memories is addressed in U.S. Pat. No. 6,581,049 to coinventor Aparicio, IV et al., entitled "Artificial Neurons Including Power Series of Weights and Counts That Represent Prior and Next Associations", and assigned to the assignee of the present invention, the disclosure of which is hereby incorporated herein by reference in its entirety as if set forth fully herein. As described in U.S. Pat. No. 6,581,049, an artificial neuron includes a plurality of inputs and a plurality of dendrites, a respective one of which is associated with a respective one of the plurality of inputs. Each dendrite comprises a power series of weights, and each weight in a power series includes an associated count for the associated power. By representing the weights as a power series, the geometric scaling as a function of input in conventional artificial neurons can be reduced to a linear scaling as a function of input. Large numbers of inputs may be handled using real world systems, to thereby solve real world applications.

SUMMARY

Some embodiments of the present invention are directed to associative memory systems that include a distributed associative memory base. The distributed associative memory base may include at least one network of networks of associative memory networks. A respective associative memory network includes associations among a respective observer memories and multiple observed memories that are observed by the respective observer memory. Ones of the associative memory networks are physically and/or logically independent from other ones of the associative memory networks. Embodiments include a processing system that is configured to observe associations into, and imagine associations from, the distributed associative memory base using multiple streaming queues that correspond to respective ones of multiple rows in the associative memory networks.

Some embodiments provide that ones of the streaming queues correspond to one of a plurality of physical locations in the associative memory networks. In some embodiments, the processing system further includes a query map that is configured to translate a semantic-space based query that is received from a user into a physical-space based query that is expressed as multiple row-based identifiers corresponding to multiple physical memory locations in the associative memory networks and that is included in at least one of the streaming queues.

Some embodiments include an ontology that is configured to be accessed by the query map to estimate taxonomic meanings corresponding to the semantic-space based query to provide query terms that correspond to a physical representation of the associative memory networks. In some embodiments, the query map includes at least one of multiple mapping policies that correspond to different ones of multiple query terms in the semantic-space based query and/or the physical-space based query. The mapping policies may define policies including rank and/or recency. The query map may modify the physical-space based query corresponding to the rank and/or recency policies.

In some embodiments, the query map is further configured to identify one or more variants of the query terms in the semantic-space based query and/or the physical-space based query and to expand the physical-space based query to include the one or more variants. Some embodiments provide that the one or more variants include synonyms, aliases and/or acronyms corresponding to ones of the query terms.

Some embodiments provide that the processing system includes multiple count server nodes that are configured to receive requests from the streaming queues and to provide count data that corresponds to associations in the distributed associative memory base responsive to the received requests. The processing system may include atom tables that are configured to provide a matrix row identification responsive to receiving a physical-space based query in a corresponding one of the streaming queues received by one of the count server nodes. The atom tables may bee further configured to provide reverse look-up data to associate returned results from the associative memory networks with the physical-space based query.

Some embodiments include a results controller that is configured to receive count data corresponding to the associations in the distributed associative memory base and to resynthesize the count data with semantic-space based namespace to provide results to a user. In some embodiments, the results controller is further configured to accumulate raw count data corresponding to ones of the streaming queues, to collapse related ones of multiple physical-space based query terms and corresponding raw count data using an ontology that was accessed by a query map, to rank order count data of collapsed physical-space based query terms, and to convert physical-space based results into semantic-space based results.

Some embodiments of the present invention include methods of querying a distributed associative memory base. Methods may include translating a semantic-space based query that is received from a user into a physical-space based query that is expressed as multiple row-based identifiers corresponding to multiple physical memory locations in at least one of multiple associative memory networks in the distributed associative memory base. Multiple query queues that correspond to the plurality of row-based identifiers may be generated. The query queues are streamed to multiple count server nodes that correspond to the associative memory networks. Count information is determined responsive to the query queues from the count server nodes. The count information from the plurality of count server nodes is translated into semantic-space based result information that is responsive to the semantic-space based query.

In some embodiments, translating a semantic-space based query includes, for each query term in the semantic-space based query, expanding the query term to include variants of the query term and the query term and determining if a taxonomic map that includes taxonomic terms that correspond to the query term exists. If the taxonomic map exists, the query term is expanded to include taxonomic terms and the query term.

Some embodiments provide that generating the query queues that correspond to the row-based identifiers includes, for each of the row-based identifiers, binding a queue resource to define a row queue. The queue resource includes one of multiple queue resources available to be bound to a row-based identifier.

In some embodiments, streaming the query queues to count server nodes includes mapping one or more of the query queues to a respective one of multiple node readers. Each of the node readers may correspond to a respective one of the count servers. Some embodiments provide that ones of the node readers are configured to perform batch requests that correspond to multiple ones of the query queues to respective ones of the count servers. Some embodiments provide that streaming the query queues to the count server nodes includes mapping the query queues to multiple node readers in a many-to-many interface between the query queues and the node readers.

In some embodiments, determining count information responsive to the query queues from the count server nodes includes determining, for ones of multiple query terms, a matrix identifier value that corresponds to matrix address data. Some embodiments provide that determining the matrix identifier value that corresponds to matrix address data includes determining atom table identification data to determine which of multiple atom table nodes includes the matrix identifier value, determining respective identification data corresponding to respective ones of the query terms, and converting the respective identification data into the matrix identifier.

In some embodiments, the atom table identification data is determined using a look-up operation. Some embodiments provide that the atom table identification data is determined using a computational method. Some embodiments include looking up a root page address of a root page of an encoded matrix that corresponds to the matrix identifier. The root page may include a matrix type value that identifies an encoding type of the encoded matrix.

In some embodiments, translating the count information includes accumulating raw count data from the query queues, collapsing previously expanded variants and taxonomic terms and respective counts of each query term in the physical-space based query and rank ordering collapsed query terms to provide relevance information of the query terms relative to one another corresponding to relative values of count data. The physical-space based query terms may be translated into semantic-space based query terms.

Some embodiments of the present invention include computer program products comprising a computer usable storage medium having computer-readable program code embodied in the medium. The computer-readable program code is configured to perform operations corresponding to methods described herein.

Some embodiments of the present invention include methods of using a distributed associative memory base. Such methods may include generating streaming query queues that correspond to a physical-space based query that is expressed as multiple row-based identifiers of multiple respective physical memory locations in at least one of multiple distributed associative memory networks. Ones of the streaming query queues may be mapped to multiple node readers that are operable to receive count information from multiple count server nodes that correspond to the distributed associative memory networks. The received count information is mapped back to corresponding ones of the streaming query queues.

Some embodiments of the present invention include associative memory methods that include providing a distributed memory base. The distributed memory base includes a network of associative memory networks, a respective associative memory network including associations among a respective observer entity and multiple observed entities that are observed by the respective observer entity, ones of the associative memory networks are physically and/or logically independent from other ones of the associative memory networks. Associations from the associative memory base are imagined using multiple streaming queues that correspond to ones of multiple rows of ones of the associative memory networks.

Some embodiments provide that imagining associations from the associative memory base includes translating a semantic-space based query that is received from a user into a physical-space based query that is expressed as multiple row-based identifiers corresponding to multiple physical memory locations in at least one of associative memory networks in the associative memory base and generating the streaming queues that correspond to the row-based identifiers.

In some embodiments, imagining associations from the associative memory base includes determining count information responsive to the streaming queues from multiple count server nodes that correspond to respective ones of associative memory networks in the associative memory base. Some embodiments provide that imagining associations from the associative memory base includes translating associative count information from the count server nodes into semantic-space based result information that is responsive to the semantic-space based query received from the user.

Some embodiments of the present invention include methods of encoding data in a large, sparse matrix that includes non-zero data locations that are identified by row identifier and column identifier values. According to such methods, spans of data locations in the matrix may be encoded using run length encoding to store runs of multiple data values that each have the same data value, as a data value and a count. Ones of non-zero data values are encoded using infinite integer encoding to compress variable length integer values that are adjacent at least one run of multiple data values that each having the same data value.

In some embodiments, encoding spans of data locations in the matrix using run length encoding includes reading fixed-length encoded matrix index words and for a given row identifier value, indexing continuous consecutive bits having zero value by providing encoded offset values in at least one fixed length encoded matrix index word.

Some embodiments provide that encoding ones of the non-zero values using infinite integer encoding includes reading variable word length non-zero data values from at least one fixed-length encoded matrix word and associating variable word length non-zero data values with corresponding column identifier values.

Some embodiments of the present invention include methods of encoding data in a large, sparse matrix that includes non-zero data locations that are identified by row identifier and column identifier values. Such methods may include reading fixed-length encoded matrix index words, for a given row in the sparse matrix, indexing continuous consecutive bits having zero value by providing encoded index offset values in at least one fixed-length encoded matrix index word and reading variable word length non-zero data values from at least one fixed-length encoded matrix index word. Methods may include reading variable word length non-zero data values from at least one fixed-length encoded matrix index word and associating variable word length non-zero data values with corresponding column identifiers.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

DETAILED DESCRIPTION

Figure 1:
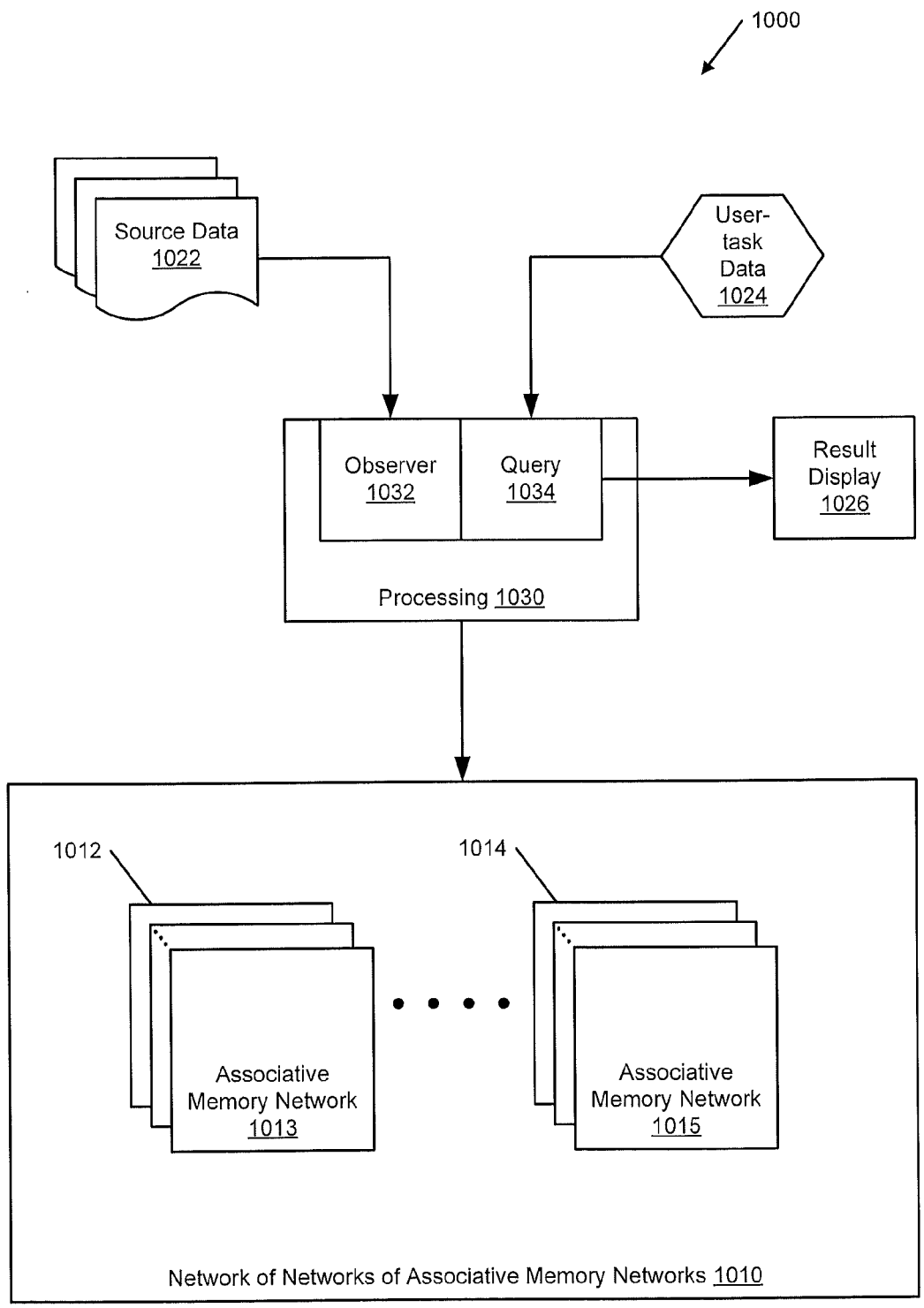
FIG. 1 is a block diagram of associative memory systems, methods and/or computer program products according to various embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flow charts of methods, systems and computer program products according to embodiments of the invention. It will be understood that a block of the block diagrams or flow charts, and combinations of blocks in the block diagrams or flow charts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flow charts provides support for methods, computer program products and/or systems (structural and/or means-plus-function).

It should also be noted that in some alternate implementations, the functions/acts noted in the flow charts may occur out of the order noted in the flow charts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Some embodiments described herein provide associative memory systems that include a distributed associative memory base. The distributed associative memory base may include at least one network of networks of associative memory networks. Some embodiments provide that a respective associative memory network may include associations among respective observer agents and multiple observed agents that are observed by the respective observer agent. Ones of the associative memory networks may be physically and/or logically independent from other ones of the associative memory networks.

Some embodiments further include a processing system that is configured to observe associations into, and imagine associations from, the distributed associative memory base using multiple streaming queues that correspond to ones of multiple rows in the associative memory networks. As used herein, streaming refers to a characteristic wherein a succession of queues are generated, transmitted, processed and/or received over time.

Some embodiments provide methods of querying a distributed associative memory base. Such methods may include translating a semantic-space based query that is received from a user into a physical-space based query that is expressed as multiple row-based identifiers corresponding to multiple physical memory locations in at least one of multiple associative memory networks in the distributed associative memory base. As described herein, a user may include a person, organization, application and/or hardware device that is capable of generating and/or transmitting a query and/or receiving and/or transmitting results of a query. Some embodiments include generating multiple query queues that correspond to the row-based identifiers and streaming the row-based identifiers to a multiple count server nodes that correspond to the associative memory networks.

Some embodiments include determining count information responsive to the row-based identifiers from the node servers and translating the count information from the node servers into semantic-space based result information that is responsive to the semantic-space based query.

Some embodiments of the present invention include methods of using a distributed associative memory base. Such methods may include generating a plurality of streaming query queues that correspond to a physical-space based query that is expressed as multiple row-based identifiers of respective multiple physical memory locations in at least one of multiple distributed associative memory networks. Some embodiments include mapping ones of the streaming query queues to multiple node readers that are operable to receive count information from multiple count server nodes that correspond to the distributed associative memory networks. Methods may further include mapping the received count information back to corresponding ones of the streaming query queues.

Some embodiments may include associative memory methods that include providing a distributed memory base that includes a network of networks of associative memory networks. Such networks may include a network of associative memory networks, such that a respective associative memory network may include associations among a respective observer entity and multiple observed entities that are observed by the respective observer entity. In some embodiments, ones of the associative memory networks are physically and/or logically independent from other ones of the associative memory networks. Some embodiments include imagining associations from the associative memory base using multiple streaming queues that correspond to ones of multiple rows of ones of the associative memory networks.

Some embodiments of the present invention including methods of encoding data in a large sparse matrix. Such methods may include providing a sparse matrix that includes non-zero data locations that are identified by row identifier and column identifier values and reading fixed-length encoded matrix index words. Some embodiments include, for a given row in a sparse matrix, indexing continuous consecutive cells, counts and/or bits having zero value by providing encoded index offset values having variable word lengths in at least one fixed-length encoded matrix index word. Additionally, variable word length non-zero data values may be read from at least one fixed-length encoded matrix index word and the variable word length non-zero data values may be associated with corresponding column identifiers.

Although examples of operations for encoding data are provided herein, the architecture described herein may be open to many different types of encoding operations that may be used in isolation and/or combination with one another. For example, any one or more of many sparse matrix methods may be applicable in embodiments described herein. In some embodiments, more than one type of encoding may be used in combination to address different characteristics that may occur in different matrices in the associative memory base. In this regard, different input-output mapping demands corresponding to different matrix characteristics may be addressed. In this manner, the architecture described herein is not limited to a specific encoding and thus may provide flexibility regarding the different matrix and/or memory characteristics.

Reference is made to FIG. 1, which is a block diagram of associative memory systems, methods and/or computer program products according to various embodiments of the present invention. As shown in FIG. 1, associative memory systems, methods and/or computer program products 1000 according to various embodiments of the present invention include an associative memory base 1010 that includes a network of networks 1012, 1014 of associative memory networks 1013, 1015. Although illustrated for exemplary purposes as two networks 1012, 1014, of associative memory networks 1013, 1015, embodiments herein may include one and/or more than two networks 1012, 1014 of associative memory networks 1013, 1015. A respective associative memory network 1013, 1015 includes therein associations and/or frequency thereof among a plurality of observed entities for a respective observer.

Still referring to FIG. 1, a processing system, method and/or computer program product 1030 is provided. The processing system, method and/or computer program product 1030 is configured to observe (read) associations into, and imagine (query) associations from, the network of networks 1012, 1014 of associative memory networks 1013, 1015 in the associative memory base 1010. The processing system, method and/or computer program product 1030 includes an observer system, method and/or computer program product 1032 and a query system, method and/or computer program product 1034. The observer system, method and/or computer program product 1032 is configured to observe into a respective network 1012, 1014 of associative memory networks 1013, 1015 the associations among a respective observer entity and a plurality of observed entities that are observed by the respective observer entity. The query system, method and/or computer program product 1034 is configured to imagine associations of entities, users and/or events from the respective network 1012, 1014 of associative memory networks 1013, 1015 in response to user queries. Results of user queries may be configured for display by a result display 1026.

Each of the respective associative memory networks 1013, 1015 may be decentralized from one another physically and/or logically. In some embodiments, respective associative memory networks 1013, 1015 may each be implemented on more than one physical device. Some embodiments provide that respective associative memory networks 1013, 1015 may each be implemented on the same physical device that includes logically different devices. In this regard, as the associative memory base 1010 may scale linearly or almost linearly, and thereby allow large networks of associative memories to be provided.

Figure 2:
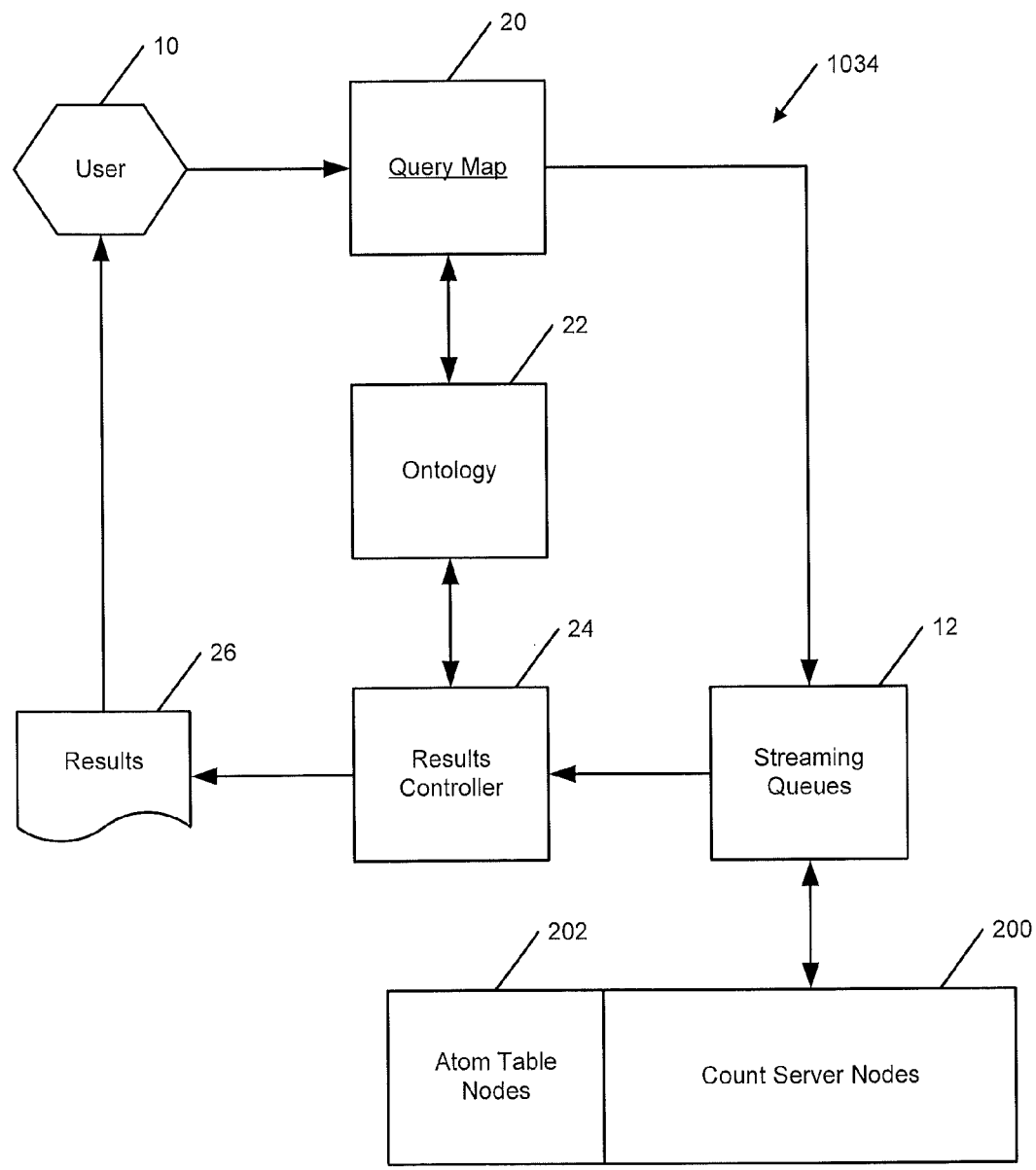
FIG. 2 is a flow chart illustrating a query overview for querying an associative memory base according to some embodiments of the present invention.

Reference is made to FIG. 2, which is a flow chart illustrating a query overview for querying 1034 an associative memory base 1010, as described above regarding FIG. 1, according to some embodiments of the present invention. A query as described herein may be performed by a system and/or computer program product, in conjunction with an associative memory base as described herein. A user 10 submits a user query in terms of a user space that may include semantic, vocabulary, language, nomenclature and/or taxonomy characteristics that may be specific to and/or typical of a user and/or a class of users.

A query map 20 receives the user query and maps the query expression to a physical representation of the associative memory base. Stated differently, the query map 20 may translate a query from user space to physical space that corresponds to the associative memory base. In this manner, the user space or user ontology is mapped down to the space corresponding to what is physically stored. For example, the user ontology may be mapped down to specific ones of the associative memories, matrices, rows, columns and/or margins thereof.

Some embodiments provide a mapping that may use an ontology 22 to determine taxonomic meanings of the user query in terms that are consistent with the physical representation of the associative memory base. In some embodiments, mapping may include determining variants of terms in the user query. Examples of variants may include synonyms, aliases, and/or acronyms corresponding to terms in the user query. Some embodiments provide that mapping may include applying mapping policies corresponding to different ones of the query terms. In some embodiments, mapping policies may provide policies regarding rank order and/or recency, among others. For example, where the query terms include a temporal dimension, mapping policies may provide that more recent information has more relevance. In this manner, mapping policies may provide information on the semantic use of the query terms.

Once the query is mapped into physical space, the query is expressed as a series of queues corresponding to multiple requests for count information from multiple physical locations in the specific ones of the associative memories, matrices, rows, columns and/or margins thereof. Some embodiments provide that the series of queues may be streamed 12 such that each queue may correspond to a request for count information from a specific row of a specific matrix in a specific associative memory. By providing a streaming flow of data, the full control of the query may be realized such that the system is not overwhelmed by data amounts that otherwise may significantly exceed typical buffer sizes. In this manner, a fast and flexible implementation of a massive scale associative memory base may be provided.

A plurality of count server nodes 200 may receive requests corresponding to the streaming queues 12 and provide count information in response thereto. In some embodiments, the count server nodes 200 may correspond to specific ones of the associative memories that may be independently located relative to one another. For example, in some embodiments, a count server node 200 may be provided for each of the associative memories. In this manner, the associative memory base may provide an associative memory network that may be implemented with virtually limitless growth and data capacity without overwhelming communication, processing and/or storage hardware resources.

An atom server may be operable to include and/or access atom table nodes 202 that can be used to map a single category:value to a row in a matrix. The location of the atom table node 202 may be used to support a reverse look-up so that the returned results from the query may be associated with the category:value in the original query.

After the count information is received from the count server nodes, a results controller 24 is operable to access the ontology 22 and resynthesize the physical language count information back to the user language. In some embodiments, the results controller 24 may collate and organize the count information according to the mapping policies. Results 26 may be presented to the user 10 and may be in a metric space that may capitalize on the transactional frequency data corresponding to the counts.

Figure 3:
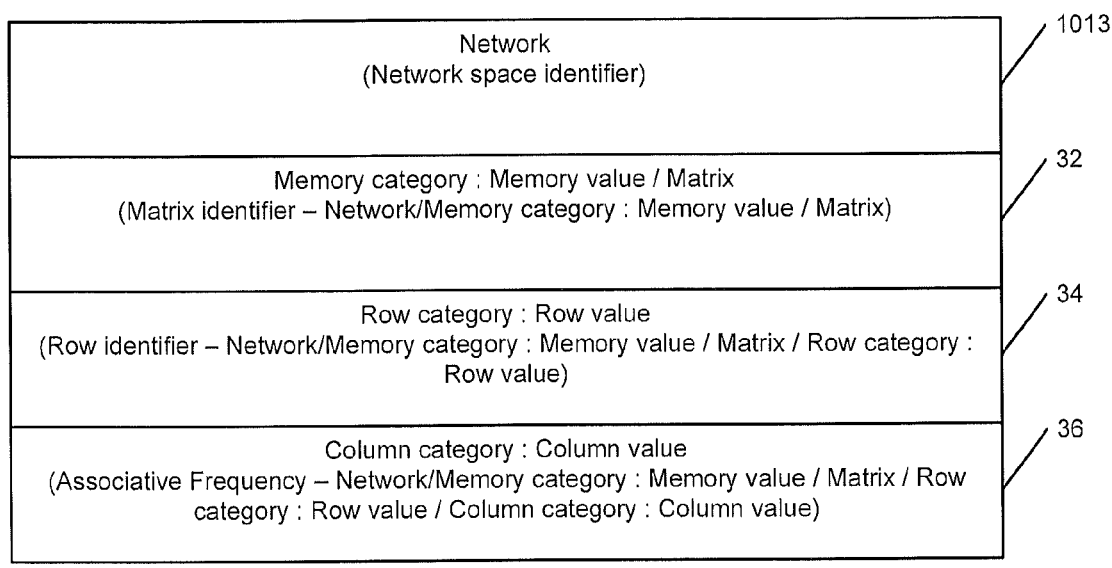
FIG. 3 is a block diagram illustrating a physical namespace hierarchy of an associative memory base according to some embodiments of the present invention.

Reference is now made to FIG. 3, which is a block diagram illustrating a physical namespace hierarchy of an associative memory base 1010 according to some embodiments of the present invention. The top level of the hierarchy in the physical namespace includes a network identifier 30 corresponding to each of the networks 1013, 1015 of associative memory networks. In some embodiments, the associative memory base may include many networks 1013, 1015, which may be located, created, administered, populated and/or originated independent of one another. Each network 1013 is further partitioned in terms of memories. In particular, as used herein, attributes for partitioning networks 1013 may be identified by a category:value ordered pair. For example, a partition corresponding to a particular memory may be identified using an ordered pair that defines memory as the category and a memory value as the value. In this manner, for example, a partition corresponding to a person named John may be identified as "person:John".

In some embodiments, each memory may include multiple associative memories and/or matrices, which may include specific identifiers. Some embodiments provide that some memories may only include a single associative memory and/or matrix. In such embodiments, a single associative memory and/or matrix may be identified consistently among the memories using an identifier such as "default", among others.

Within each memory, a row within a matrix may be identified using the category:value ordered pair concept discussed above regarding memories. For example, a row corresponding to the city of London may be identified as "place:London". Some embodiments herein provide that the identification of a specific row within a specific matrix in a specific network may be used to represent a query term. In this manner, the corresponding count server node may receive, as an input, a query including a term that is identified as "Network/Memory category:Memory value/Matrix/Row category:Row value."

In response, the count server node 200 may provide corresponding column information in the form of the aforementioned category:value identification. In this regard, a specific cell in the memory may be identified as "Network/Memory category:Memory value/Matrix/Row category:Row value/Column category:Column value" and may include a count value that represents the particular associative frequency corresponding to the semantic association between the agent, row and column attributes. For example, a value stored in the cell identified in the physical namespace as "Network/place:London/Default/Person:John/Activity:banking" would represent the number of times the memory (place) London observed person John conducting banking activities. In this regard, the association between the row and column (John and banking) is observed from the perspective of the memory (London). Accordingly, a row-based query may be used to determine the frequency of association that represents the number of counts in the triple association between the memory, row and column.

By determining the associative frequency, events and/or associations may be evaluated using statistical processes in addition to semantic reporting. For example, weighting, relevancy, entropy ranked and/or recency may be determined and/or used to provide analysis of the frequency of the triple association. In this manner, analyzing the associations using experiences provides significantly greater analytical value than merely storing and/or reporting that the relationships exist.

Figure 4:
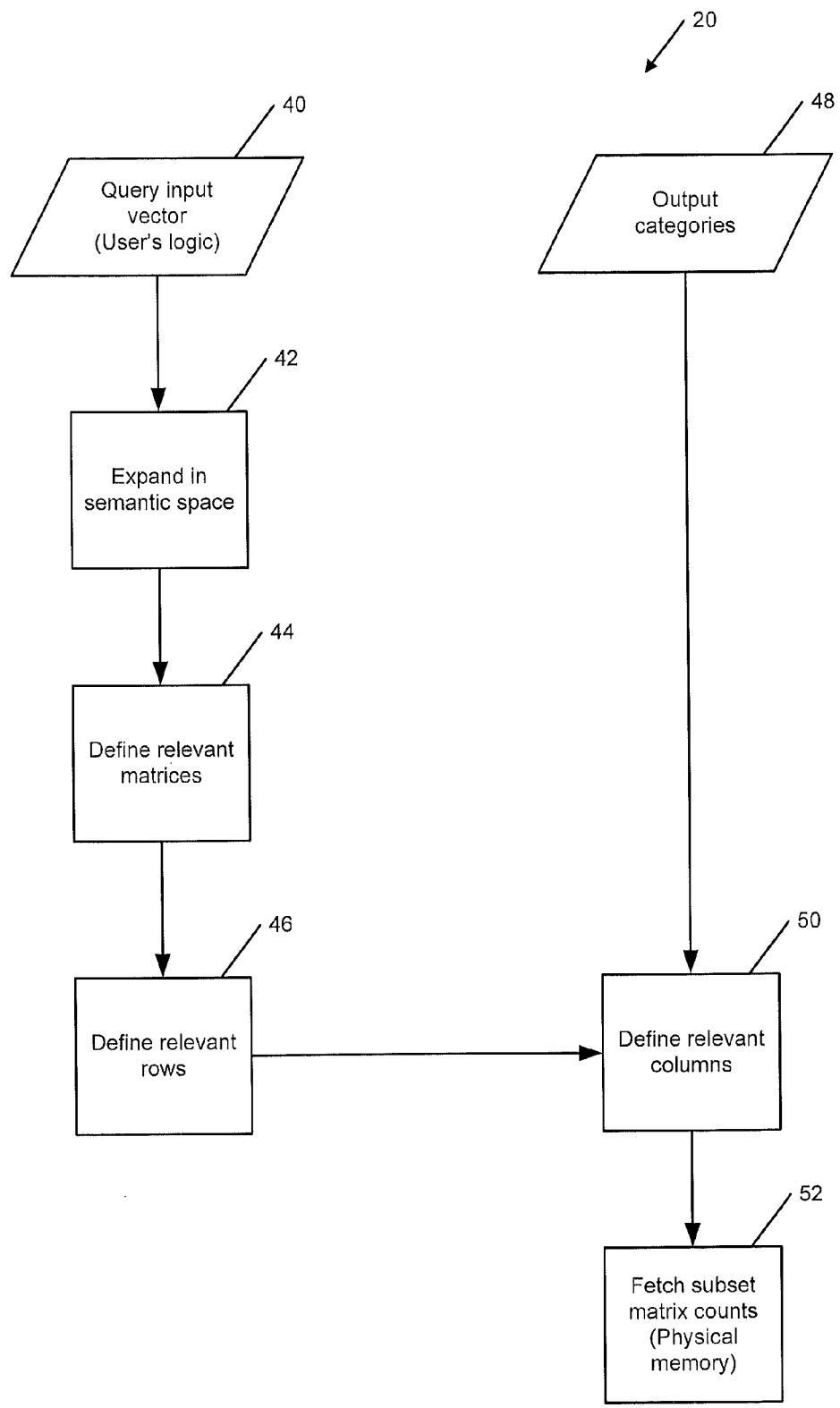
FIG. 4 is a flow chart illustrating an overview of a query map operation 20, as described above regarding FIG. 2, according to some embodiments of the present invention.

Reference is now made to FIG. 4, which is a flow chart illustrating an overview of a query map operation 20, as described above regarding FIG. 2, according to some embodiments of the present invention. The user's logic is received as a query input vector 40, which may be a set of terms provided by the user. The query input vector is expanded into semantic space to represent the physical name space that corresponds to the namespace of the physical memory of the associative memory base (block 42). The expansion may be performed using the ontology 22, as described above regarding FIG. 2 and may generate an attribute vector that may be used to define relevant matrices (block 44). Stated differently, ones of the matrices that have some memory/knowledge of attributes in the attribute vector may be defined. In this manner, the physical structures that include information relevant to the query may be identified.

Relevant rows with information corresponding to other ones of the query terms may be defined (block 46). In this manner, physical location of the rows within each of the defined matrices that include information corresponding other ones of the query terms are identified. For example, in the case of an attribute vector including query terms corresponding to "person: John", "place:London", and "activity:banking" may define a relevant matrix corresponding to "person:John" and relevant rows corresponding to "place:London" and "activity:banking". Accordingly, streaming queues corresponding to each of the defined rows may be processed as inputs to the count server nodes 200 described above regarding FIG. 2. For example, one of the streaming queues may provide an input defined as "Network1/person: John/Default/place:London" and another one of the streaming queues may provide an input defined as "Network1/person:John/Default/activity:banking".

An output category 48 may be provided to define relevant columns corresponding to the query terms in the attribute vector (block 50). In this manner, the physical locations within the memory base of knowledge corresponding to the query terms in the attribute vector are specifically identified. Some embodiments provide that the namespace of the physical locations may be translated and/or resolved into integer indices. In some embodiments, the translation and/or resolution of the namespace identifiers into integer indices may be performed independently at each level of the hierarchical namespace structure.

Once each of the physical memory locations corresponding to the row/column identifications are defined, the subsets of matrix counts corresponding to those physical memory locations are fetched (block 52). As a row-based organizational approach may be used, the partitioning is based on namespace. In this regard, the partitions may provide a manageable data quantity that may be processed via the streaming queues. Additionally, some embodiments provide for a variable data distribution strategy that may provide, for example, memory routing vs. row routing in the case where a memory is particularly small. The variable distribution strategy may consider a memory size and adapt the routing responsive thereto.

Figure 5:
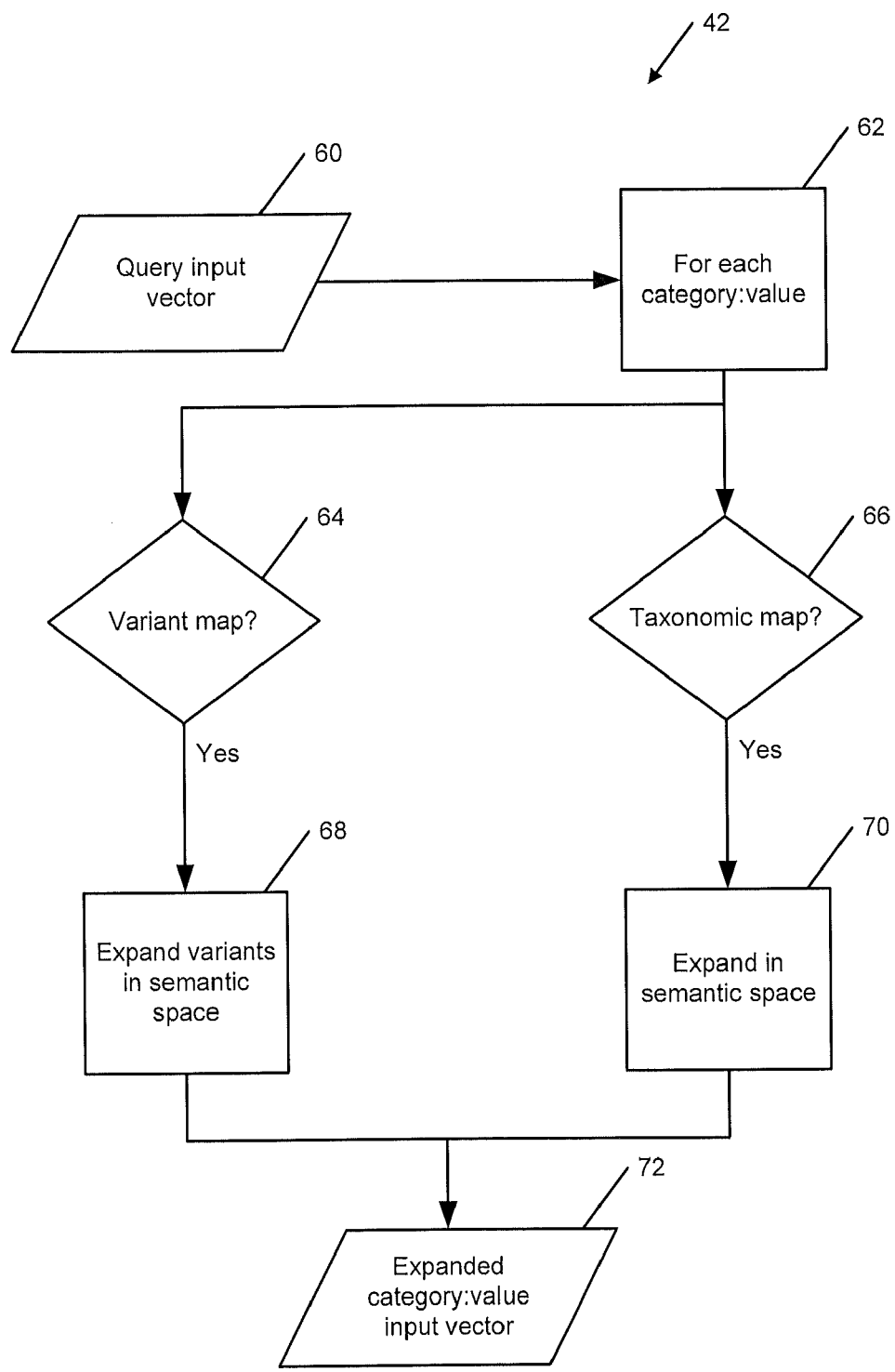
FIG. 5 is a flow chart illustrating operations corresponding to expanding semantic space 42, as described above regarding FIG. 4, according to some embodiments of the present invention.

Reference is now made to FIG. 5, which is a flow chart illustrating operations corresponding to expanding semantic space 42, as described above regarding FIG. 4, according to some embodiments of the present invention. Expanding semantic space 42 includes, for each category:value 62 in a query input vector 60, determining if a taxonomy exists for the attribute, generating a taxonomic map (block 66), determining variants and generating a variant map (block 64).

Some embodiments provide that a variant map may provide a query expansion to include attributes corresponding to different spellings, acronyms, abbreviations, etc. In some embodiments, taxonomic maps may provide a query expansion that provides a controlled expansion of the attribute vocabulary. For example, a taxonomic map corresponding to the attribute "January" may include "winter", "$1^{st}$ month", and/or "cold", among others. Similarly, a taxonomic map corresponding to the attribute "truck" may include "vehicle", "cargo", and/or "Mack", among others.

In some embodiments, an expansion according to taxonomy may provide additional attributes that increase and/or decrease in level of abstraction. In some embodiments, the taxonomic mapping may operate similar to a thesaurus function in that the attribute may be expanded to include synonyms. Some embodiments provide that the taxonomic mapping may provide all nouns and verbs corresponding to the query attribute.

If variant maps and taxonomic maps are generated corresponding to the query attribute, each of these query attributes are expanded, respectively (blocks 68 and 70). Some embodiments provide that a hierarchical taxonomic structure may be provided to supplement and/or replace a query attribute. The query input vector is then expanded to include the variant and/or taxonomic expansions (block 72). In this manner, the query input vector is now provided as an expanded attribute vector expressed in expanded physical namespace.

Figure 6:
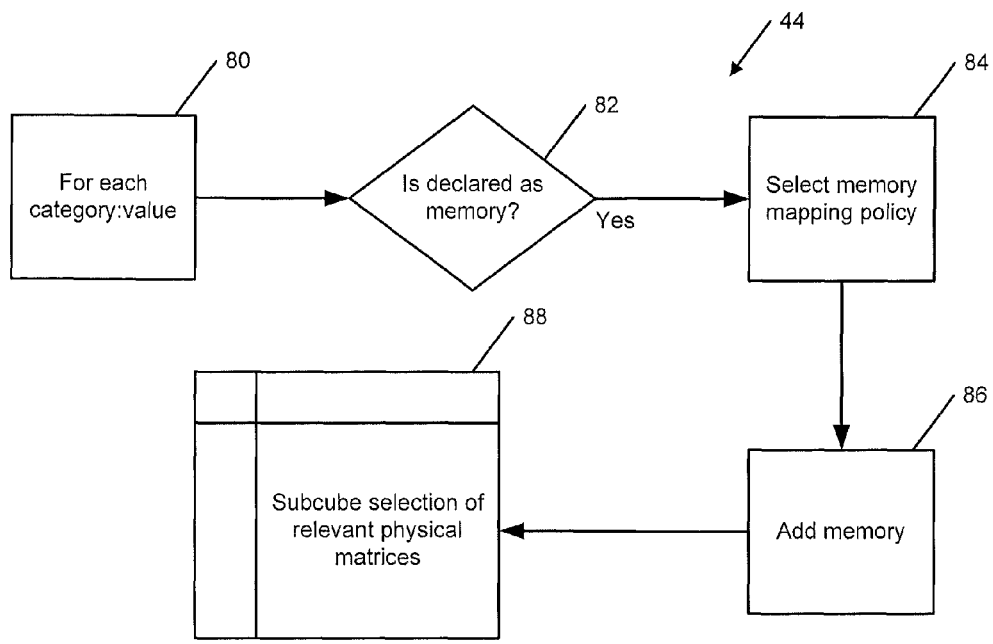
FIG. 6 is a flow chart illustrating operations corresponding to defining relevant matrices 46 of the expanded attribute vector, as described above regarding FIG. 4, according to some embodiments of the present invention.

Reference is now made to FIG. 6, which is a flow chart illustrating operations corresponding to defining relevant matrices 46 of the expanded attribute vector, as described above regarding FIG. 4, according to some embodiments of the present invention. For each category:value 80, operations determine if the category:value is declared as a memory (block 82). If the category:value is declared as a memory, then a corresponding memory mapping policy may be selected (block 84).

The memory mapping policy may be operable to define how many matrices, if more than one, are included for the memory. For example, the simplest mapping policy may define that the memory includes a single matrix. In some embodiments, a memory mapping policy may provide semantics that define multiple matrices and/or memories as a function of one or more characteristics, such as temporal divisions. For example, a time slicing semantic may provide that a new matrix is generated/provided for each predefined temporal unit, such as an hour, day, week, month, quarter, season and/or year, among others. In this manner, steady state system performance may be achieved since the matrices corresponding to specific time slices may not continue to grow beyond a manageable scale and may provide steady state ingestion of retrieved information. In some embodiments, the memory mapping policy may define a recency bias corresponding to time sliced matrices. For example, more recent data may be more relevant, interesting, important and/or compelling than less recent data. In this regard, information from time sliced matrices may be independently weighted to provide greater weight to more recent data and less weight to less recent data. In some embodiments, weighting the matrix data may be performed on the counts as they are retrieved from the matrix such that the counts that are received corresponding to the streaming queues include the weighting. Some embodiments provide that the weighting may be performed on the count data after the results are received from the streaming queues.

Some embodiments provide that a memory mapping policy may include a capacity-based policy such that a maximum matrix size may be defined to achieve an objective of containing the matrix dimensions to as small as reasonably possible. For example, a memory mapping policy may be physically defined for system performance based on advantages of knowing matrix dimensional limits. Although a time slicing semantic, as discussed above, may naturally achieve that objective as well, some data may not be temporally based and thus time slicing may be inapplicable for defining a matrix dimensional limitation.

Based on the memory mapping policy, one or more memories/matrices are added (block 86) to provide a subcube selection of the relevant physical matrices corresponding to each category:value declared as a memory (block 88).

Figure 7:
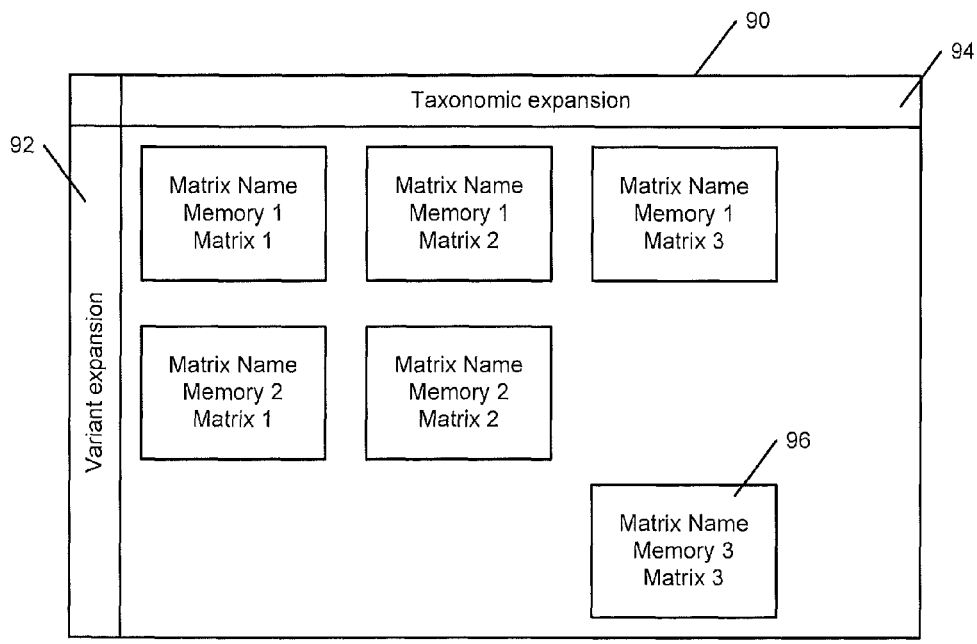
FIG. 7 is a block diagram illustrating an expanded subcube of selected matrices, as discussed above regarding FIG. 6, in accordance with some embodiments of the present invention.

Reference is now made to FIG. 7, which is a block diagram illustrating an expanded subcube of selected matrices of the associative memory base 1010 as described in FIG. 1 and as discussed above regarding FIG. 6, in accordance with some embodiments of the present invention. Some embodiments provide that the subcube of selected matrices may be expanded as variant expansion 92 along a first axis and a taxonomic expansion 94 along a second axis. In this manner, the relatedness of memories 96 may be maintained.

In some embodiments, the taxonomic expansion 94 provides that the different memories 96 for the same matrix/memory are provided in the same row. For example in the case of a temporal policy, memory 1 matrices 1, 2 and 3 may correspond to time slices for months January, February and March, and may be arranged in a row to preserve the relatedness of the different memories 96. By preserving the relatedness of the memories 96, the data may be further exploited to include a recency and/or distance bias, among others.

Some embodiments provide that the variant expansion 92 provides for the relatedness of the memories regarding the variants. For example, the columnar arrangement of memories may preserve the relationship between synonyms, abbreviations, replacements, and/or acronyms, among others. Note that, at this point, the subcube is represented by matrix names and does not include row or column information. For example, as discussed above, the frequency information (counts) corresponding to the triple store association includes the memory (agent), row and column. In that regard, the subcube of selected matrices represents identifications of the memories and/or matrices. Accordingly, satisfying the query also includes defining the row and column subsets.

Figure 8:
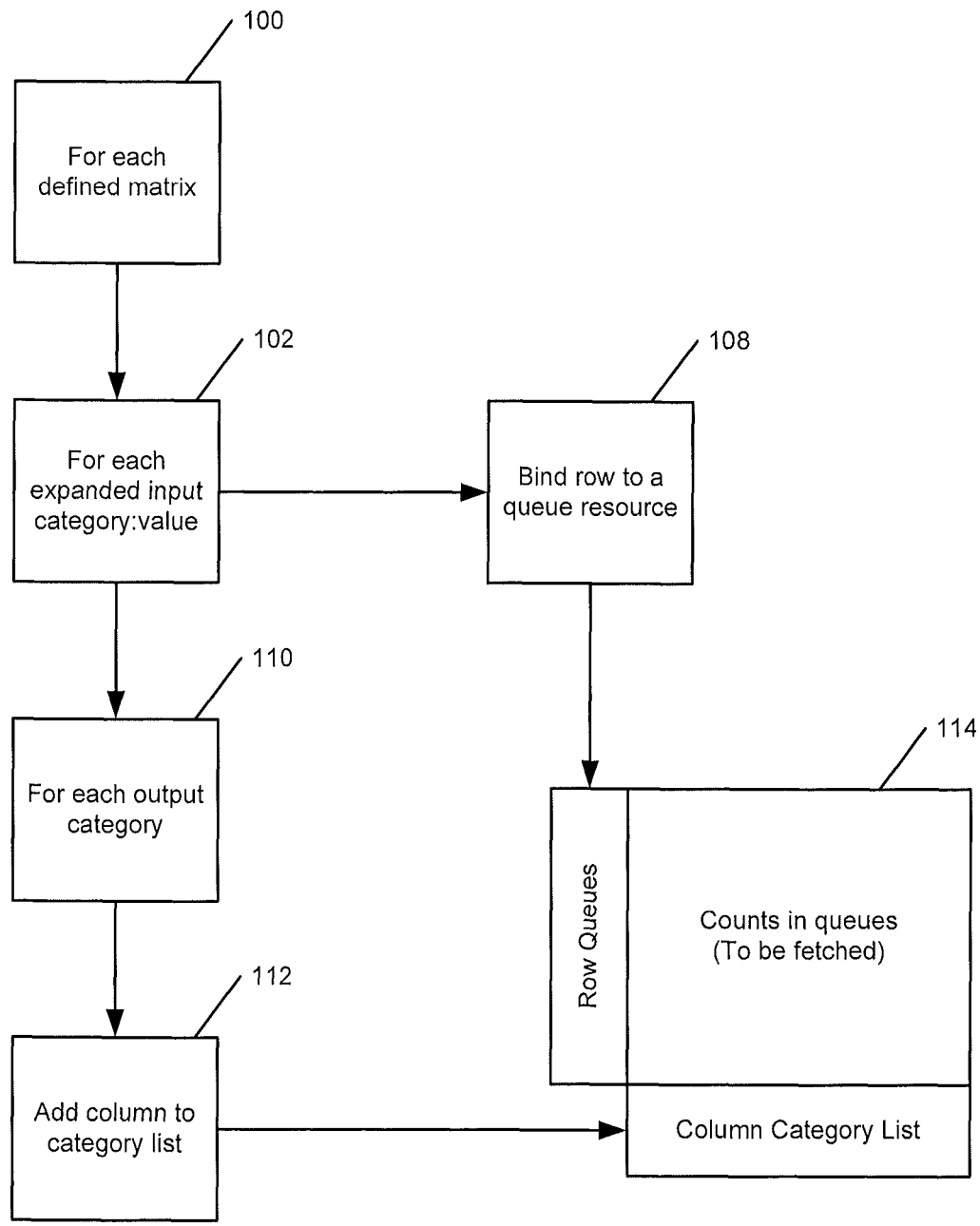
FIG. 8 is a flow chart illustrating defining the row and column subsets, as discussed above regarding FIG. 4, in accordance with some embodiments of the present invention.

Reference is now made to FIG. 8, which is a flow chart illustrating defining the row and column subsets, as discussed above regarding FIG. 4, in accordance with some embodiments of the present invention. Some embodiments provide that defining the row and column subsets is performed for each of the matrices corresponding to an expanded category: value (block 100). For each expanded input category:value (block 102), a row corresponding to the category:value input may be bound to a queue resource (block 108) to define a row queue. Some embodiments provide that the matrix may not be not checked to see if a row corresponding to the category: value is included. In this regard, the row queue may be defined without specific knowledge of the matrix content.

In some embodiments, the determination may include determining if the row exists in the matrix. Some embodiments provide that the determination is made and, if the row is not in the matrix, then no queue resource is bound corresponding to that category:value input. If the matrix includes a row corresponding to the category:value input, that row may be bound to a queue resource (block 108) to define a row queue.

In some embodiments, multiple queue resources may be provided as a pool of multiple queues that are available to be bound to rows as the rows are defined. Some embodiments provide that queue resources may include a fixed and/or predefined format and/or size. In this manner, processing and/or streaming the queues may be performed using a standardized approach based on the fixed and/or predefined format and/or size. In some embodiments, queue resources may be generated and/or created for the rows as the rows are defined.

For each output category (block 110), the output category is added to the column category list (block 112). In this manner, the column portion of the row/column subsets may be defined. For each of the defined matrices, the defined row queues and column category list may define a subset 114 for which the counts may be retrieved. In this manner, the margins of each of the defined matrices may be defined. The margins of the defined matrices may be used to define which portions of each of the rows in each of the matrices include data that corresponds to the query.

Figure 9:
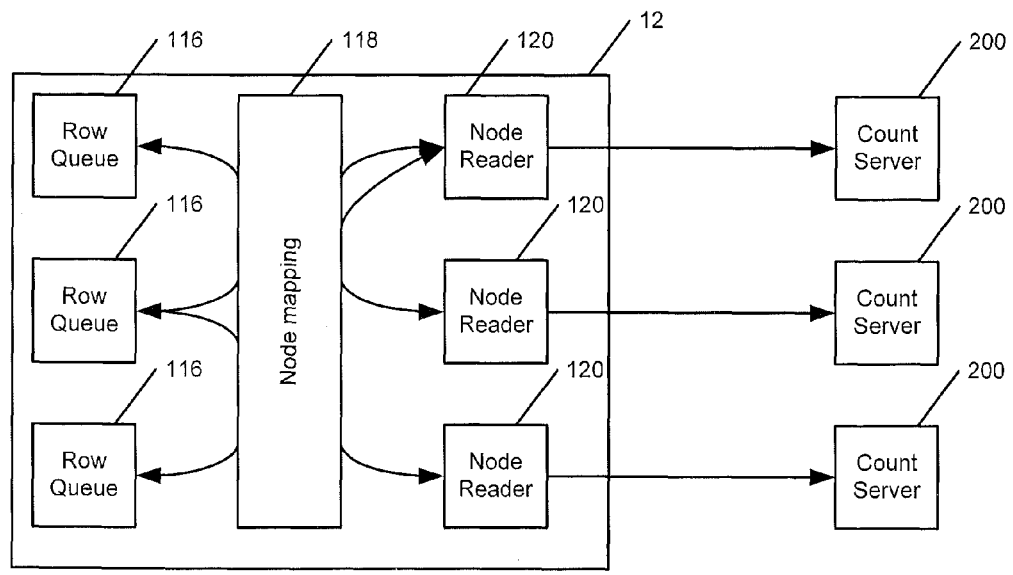
FIG. 9 is a flow chart illustrating operations corresponding to streaming queues 12 as discussed above regarding FIG. 2, according to some embodiments of the present invention.

Reference is now made to FIG. 9, which is a flow chart illustrating the operations corresponding to streaming queues 12, as discussed above regarding FIG. 2, according to some embodiments of the present invention. After binding the queue resources to the queues, as discussed above regarding FIG. 8, the row queues 116 may be streamed to access count server nodes that correspond to specific ones of the associative memories/matrices that may be independently located relative to one another. A node mapping operation 118 may be used to map multiple ones of the row queues 116 to multiple node readers 120, that may include a one-to-one correspondence to the multiple count server nodes 200. In this regard, the node mapping operation 118 may provide a many-to-many interface between the row queues 116 and the node readers 120.

In some embodiments, a node reader 120 may perform a request from its corresponding count server node 200 based on a query corresponding to a single row queue 116. Some embodiments provide that the node reader 120 may perform a batch request from its corresponding count server node 200 based on queries corresponding to multiple row queues. For example, multiple ones of the row queues 116 may include queries from the same associative memory and/or matrix. In this manner, the number of requests of a matrix from a particular count server node 200 may be reduced and/or minimized.

Responsive to the requests from a node reader 120, the count server node 200 may return count data to the node reader 120 that corresponds to the row queues 116. In some embodiments, the node reader 120 is operable to return counts and/or corresponding identifiers to the row queue. Some embodiments provide that the node mapping operation 118 includes at least one computation. In this manner, the node mapping may be performed without using a look-up table. Accordingly, the distributed associative memory base may adapt and/or grow without exceeding dimensionality limitations that a look-up table might present.

Figure 10:
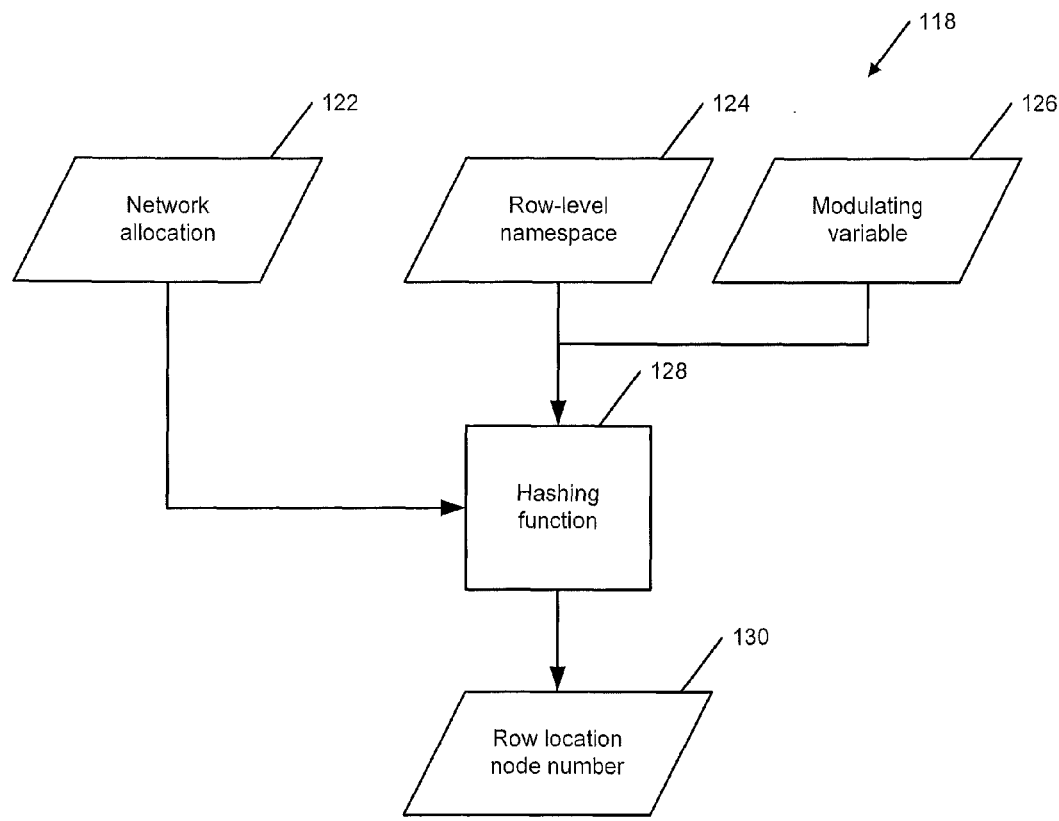
FIG. 10 is a flow chart illustrating operations for mapping a defined row in a row queue to a row location number according to some embodiments of the present invention.

Reference is now made to FIG. 10, which is a flow chart illustrating operations for mapping a defined row in a row queue to a row location number, as discussed above regarding node mapping 118 in FIG. 9, according to some embodiments of the present invention. Since the node reader (120 of FIG. 9) may be specific to each of the count server nodes (200 of FIG. 9), the row location node number is determined. For each row queue, the row-level namespace 124, along with any modulating variables 126, may be subjected to a hashing function 128 to generate a hash code representing a row location number 130. In some embodiments, network allocation information 122 may also be used by the hashing function 128. In some embodiments, the network allocation 122 may correspond to the network resources that comprise the associative memory base 1010. Some embodiments provide that the row location node number 130 is determined via computation. In this regard, the row-level namespace may be converted to an integer row location node number that may include an identification corresponding to which machine of a large number of machines includes the row.

The modulating variables 126 may provide other concatenations that cause the hash code to deviate to other spaces. In this manner, flexibility may be provided. For example, as the associative memory base 1010 grows, the modulating variables may be adjusted to provide identifications corresponding to additional machines.

Some embodiments provide that a hashing function 128 may include hashing function applied to the row-level namespace 124 and/or the modulating variables 126 to generate a hash code. In some embodiments, the network allocation 122 may include a quantity of machines in the cluster and the machine cluster offset. Some embodiments (not illustrated) provide that a modulo operation may be applied to the hash code using the quantity of machines in the cluster. The result of the modulo operation may be combined with the machine cluster offset to determine the row location node number 130. Approaches using the machine cluster information in a modulo operation, however, may have the effect of unnecessarily imposing limits on the growth and scale of the associative memory base.

Figure 11:
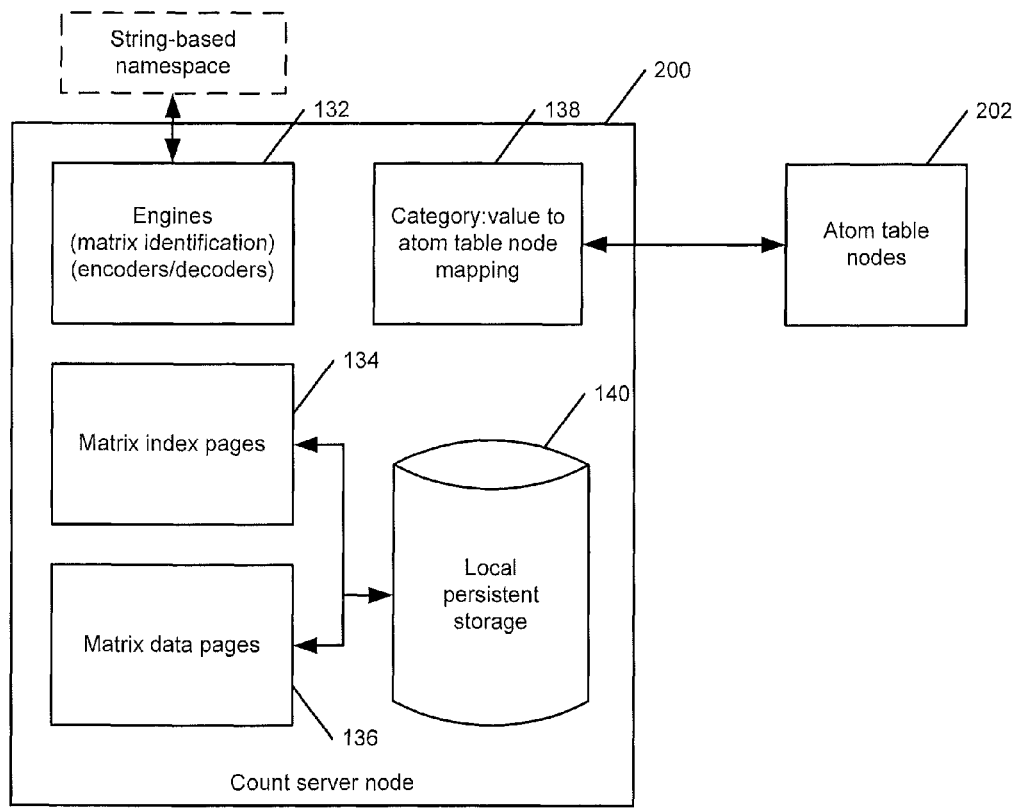
FIG. 11 is a block diagram illustrating an overview of a count server in accordance with some embodiments of the present invention.

Reference is now made to FIG. 11, which is a block diagram illustrating an overview of a count server node in accordance with some embodiments of the present invention. In some embodiments, the count server includes one or more count server nodes 200 and one or more atom table nodes 202, as discussed above regarding FIG. 9. A count server node 200 may include multiple processing engines 132 configured to drive internal processes such as, for example, matrix identification, encoders and/or decoders, among others.

Some embodiments provide that the count server node 200 may include category:value to atom table node mapping 138 that may provide an atom table location number corresponding to the category:value attribute. The atom table location number may be used to select an atom table, if applicable, within the selected atom table node 202 to resolve an identifier that becomes the key value to the matrix. The key value to the matrix may be used in matrix index pages 134 and/or the matrix data pages 136. In some embodiments, the matrix index pages 134 may include one or more B+ tree pages, but other forms of indexing may be used to relate the key value to the matrix. As described herein, matrix index pages 134 may include the identification of other pages, which may also be matrix index pages 134 or may be matrix data pages 134. The matrix data pages 134 may include matrix location information regarding the location of data, such as, for example, count data corresponding to the query.

Some embodiments provide that the matrix index pages 134 resolve the physical location of the data in a persistent storage 140 based on the key value. In some embodiments, a portion of the key value may include a page address in the persistent storage.

Thus, the count server node 200 receives namespace based strings, converts them to key values, retrieves count data corresponding to the key values. On the return, some embodiments provide that the key values may be converted back to namespace based strings. In some embodiments, the returned values may be maintained as identifier integers that may flow back into the queue streams. In this manner, subsequently applied ordering and stepping controls may operate on the category:value as an integer identifier rather than as a namespace based string. In this manner, more efficient integer compare operations may be used instead of string compare operations. Accordingly, the interface definition to the count server node 200 is namespace string based in the input direction.

The persistent storage 140 is local to each count server node 200. In this manner, other than the atom table nodes 202, the local persistent storage 140 provides a shared nothing architecture in which each node is independent and self-sufficient, and there may be no single point of contention across the system. As the count server node 200 performs substantial search and count retrieval operations locally, the associative memory base may be increased by adding additional machines thereby providing substantially linear scalability in a distributed associative memory base.

Figure 12:
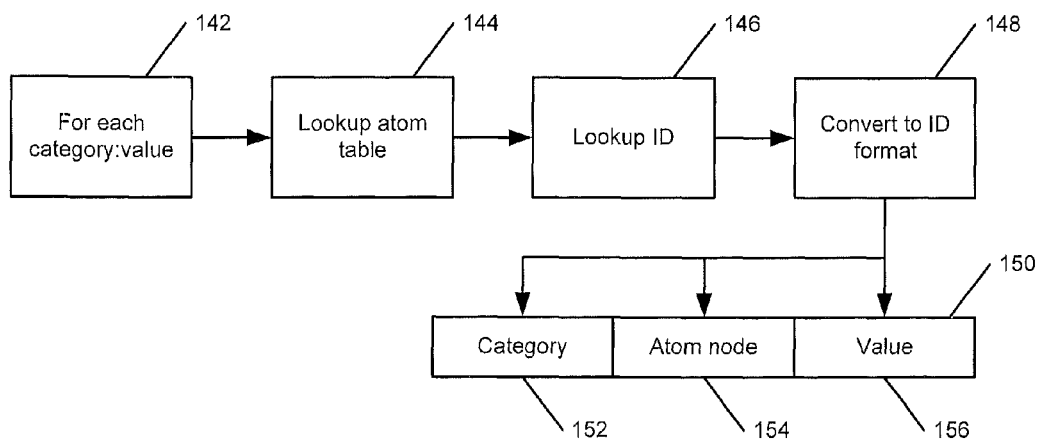
FIG. 12 is a flow chart illustrating operations for category: value to identification bitfield mapping (block 138) in a count server node 200, as discussed above regarding FIG. 10, according to some embodiments of the present invention.

Reference is now made to FIG. 12, which is a flow chart illustrating operations for category:value to identification bitfield mapping (block 138) in a count server node 200, as discussed above regarding FIG. 11, according to some embodiments of the present invention. For each category:value (block 142) an atom table look-up is performed (block 144). In some embodiments, the atom table look-up may be used to determine which among multiple atom table nodes includes the identification data corresponding to the category:value in the query. After the atom table node is looked up, the identification data is looked up in that atom table node (block 146). Although described as look-up operations, some embodiments provide that the atom table may be determined computationally via a hashing function and/or other computational method.

The identification data is converted to provide an identification format that may be referred to as a key value (block 148). In some embodiments, a key value format 150 may include a category index field 152, an atom node field 154, and/or a value index field 156, among others. Each of the category index field 152, atom node field 154 and value index field 156 may be configured to include data values that correspond to the category, atom node, and value information, respectively. The key value format 150 may provide that the various fields 152, 154, and 156 may be flexible in length. By providing an atom node field 154, a reverse look-up may be performed later when associating the return data from the matrix with the category:value. In some embodiments, the key value format 150 may include a fixed bit length. For example, the key value format may be 16, 32, 64, 128 and/or 256 bits, among others.

Figure 13:
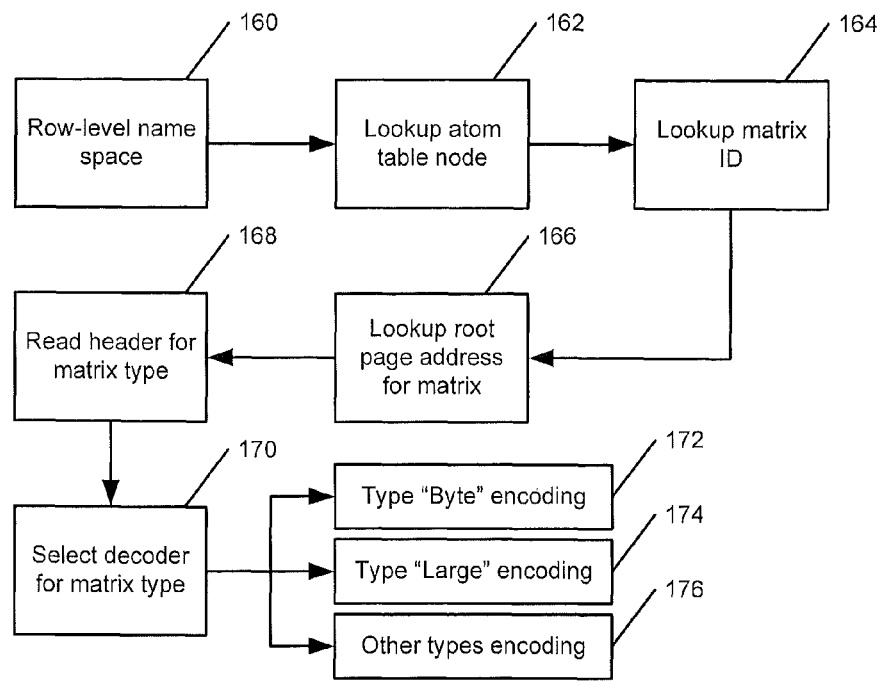
FIG. 13 is a flow chart illustrating operations for matrix identification in a count server node 200, according to some embodiments of the present invention.

Reference is now made to FIG. 13, which is a flow chart illustrating operations for matrix identification in a count server node 200, according to some embodiments of the present invention. Identifying the matrix corresponding to row-level namespace 160, such as, for example, a category:value attribute, may include looking-up an atom table node (block 162). The matrix identifier, also referred to as a key value, may be looked-up (block 164). In some embodiments, the key value and/or one or more fields therein may be compressed.

A root page address for the matrix is looked-up using the key value (block 166). In some embodiments, the root page represents the starting page corresponding to an encoded matrix. Some embodiments provide that that header of the root page is read to determine the matrix type (block 168). In some embodiments, a matrix type may include a "Byte" type matrix that is small enough to include all of the rows of the matrix in the root page. In this regard, the decoder for the matrix may be selected (block 170) for a type "Byte" decoding (block 172).

Some embodiments provide that the matrix type may include a large matrix that uses more than one page to identify all of the rows. In this regard, the decoder for the matrix may be selected (block 170) for a type "Large" decoding (block 174). Other types of decoding (block 176) may be provided as well according to some embodiments of the present invention. For example, prior/next, triangular, and/or bit plane decoding, among others, may be used.

Figure 14:
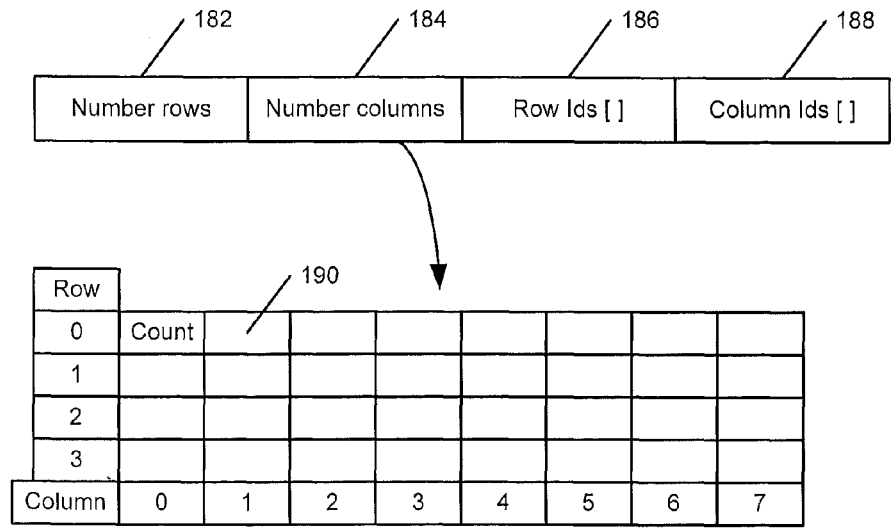
FIG. 14 is a block diagram illustrating a standard byte matrix that is encoded according to some embodiments of the present invention.

Reference is now made to FIG. 14, which is a block diagram illustrating a standard byte matrix that is encoded according to some embodiments of the present invention. As discussed above regarding FIG. 13, a byte matrix is not a large matrix and may reside on a single root page. In some embodiments, a maximum size may be defined for the byte matrix. For example, a total size may be limited not to exceed 16 k bytes. Some embodiments may provide byte matrices including different total sizes that may be less and/or more than 16 k bytes. In some embodiments, other types of locally compact representations may be encoded including, for example, prior-next, triangular, and/or bit-plane, among others.

In some embodiments, the byte matrix includes header information 180 that defines the number of rows 182, the number of columns 184, the row identifiers 186, and/or the column identifiers 188, among others. In some embodiments, the row identifiers 186 and/or the column identifiers 188 may be provided in their index order and may be determined via index variable such as "N" and "M", respectively. In this regard, the byte matrix may include an N×M array of cells 190 that include counts. By using row indexing, once the row index is determined, the other rows can be accessed directly using an offset value relative to the current row. Although when initialized, the byte matrix may be heavily populated, as the byte matrix is further populated, it becomes increasingly sparse. In some embodiments, the data may be flattened by including rows and/or columns that share the same date and/or temporal characteristic.

Figure 15:
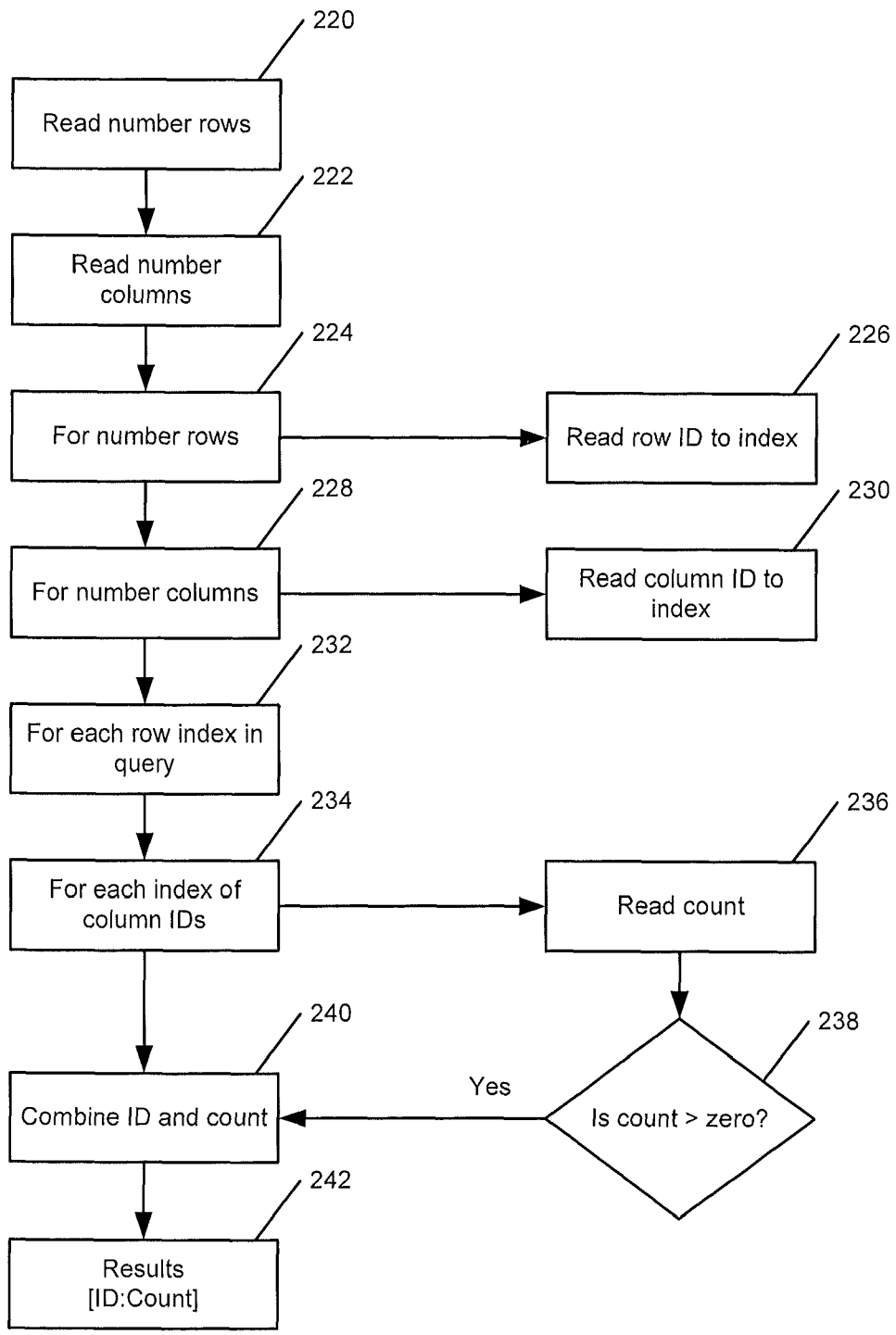
FIG. 15 is a flow chart illustrating operations for decoding a standard byte matrix as discussed above regarding FIG. 14, according to some embodiments of the present invention.

Reference is now made to FIG. 15, which is a flow chart illustrating operations for decoding a standard byte matrix as discussed above regarding FIG. 14, according to some embodiments of the present invention. Some embodiments provide that decoding a standard byte matrix includes reading the number of rows (block 220) and reading the number of columns (block 222). As discussed above regarding FIG. 14, the number of rows and the number of columns may be determined by reading the header information 180.

For the number of rows (block 224), the row identifiers are read to a row index (block 226). Similarly, for the number of columns (block 228), the column identifiers are read to a column index (block 230). Counts corresponding to each cell are read by indexing each indexed row identifier and column identifier combination (blocks 232, 234, 236). Specifically, for each row index in the query (block 232) and for each column index in the query corresponding to each of the row indexes (block 234), the count data is read (block 236). If the count is greater than zero (block 238), then the row/column identifier and the corresponding count are combined (block 240) to provide an indentifier:count result (block 242). If the count value is zero, then no result corresponding to the identifier may be provided.

Figure 16:
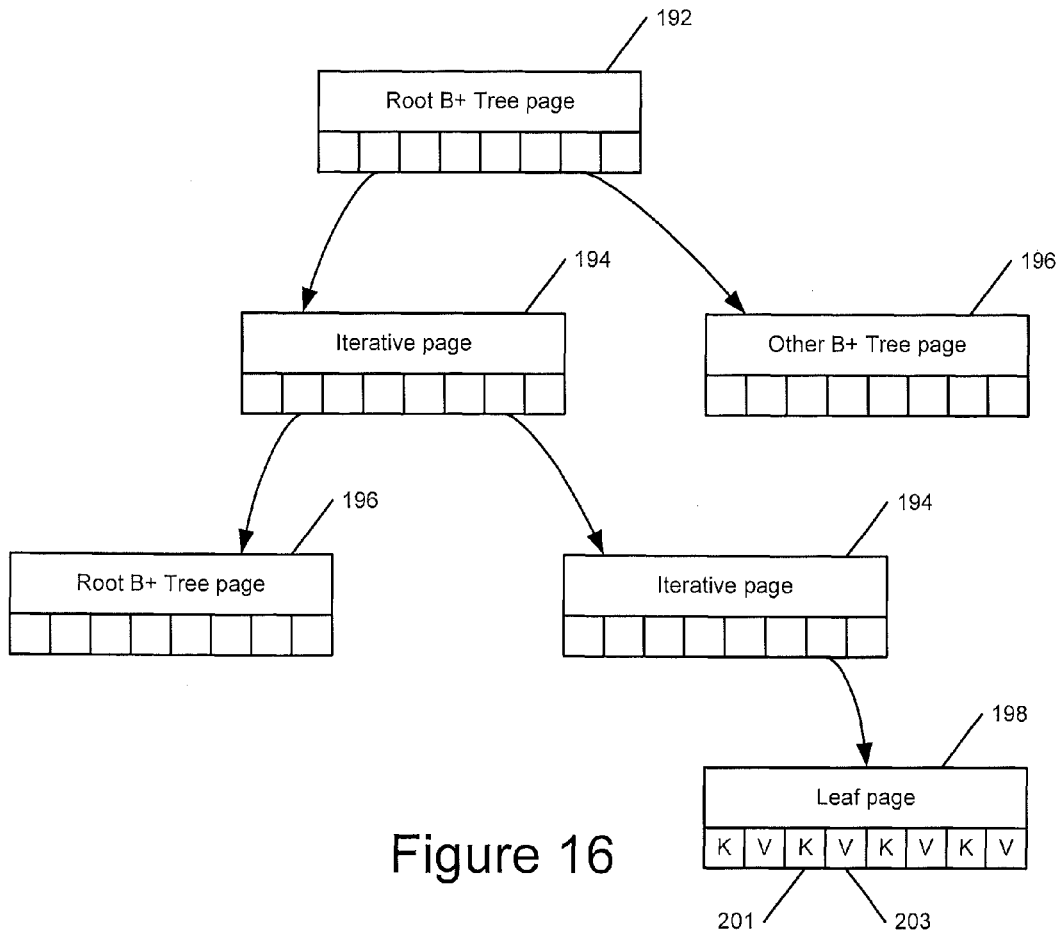
FIG. 16 is a block diagram illustrating a large matrix tree for encoding a large matrix according to some embodiments of the present invention.

Reference is now made to FIG. 16, which is a block diagram illustrating a large matrix tree for encoding a large matrix according to some embodiments of the present invention. In some embodiments, the large matrix tree may include, for example, a B+ tree page, which may represent sorted data in a manner that allows for efficient insertion, retrieval and/or removal of the counts, each of which may be identified with a key. Some embodiments provide that the large matrix tree may include a large fan-out that may minimize the number of input/output operations to provide observations on very large, sparse, count matrices. In this manner, the large matrix tree may reduce a large matrix to areas of non-zero count values.

In some embodiments, the large matrix tree includes a root page 192 that may include references to iterative pages 194 that may further define a leaf page 198 that includes keys 201 and values 203 that include the rows and count data within the large matrix. Some embodiments provide that the root page 192 and/or an iterative page 194 may include references to other B+ tree pages 196 and/or other iterative pages 194. Some embodiments provide that the keys 201 define a starting point of an encoded data string corresponding to one or more encoding schemes. For example, some embodiments provide that a key 201 may provide a starting point of a run length encoding and/or associative count encoding that may be provided by the value 203. In some embodiments, the value 203 points to a portion of the cells in a particular row of the matrix. Some embodiments provide that the value 203 may include a fixed length, such as, for example, 4, 8, 16, 32, 64 and/or 128 bytes, among others.

Figure 17:
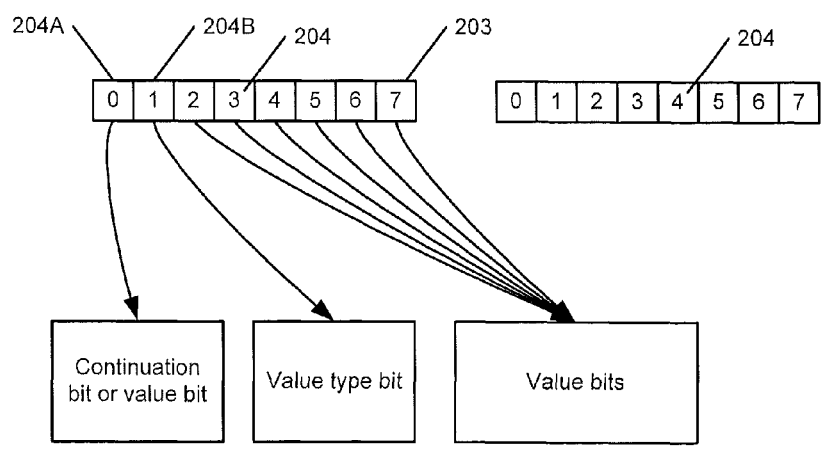
FIG. 17 is a block diagram illustrating cell run encoding, as discussed above regarding FIG. 16, according to some embodiments of the present invention.

In some embodiments, very large, sparse matrices may be encoded using a cell run encoding as described herein. Some embodiments of cell run encoding may be further explained with reference to FIG. 17, which is a block diagram illustrating cell run encoding, as discussed above regarding FIG. 16, according to some embodiments of the present invention. In some embodiments, cell run encoding may provide a data compression for very large, sparse matrices that may include selectively hybridized characteristics of a run length encoding and an infinite integer encoding. Run length encoding is a form of data compression in which runs of data may be stored as a single data value and count, rather than as the original run. For example, in the case of very large sparse matrices, run length encoding may be used to span large quantities of zero values. Additionally, infinite integer encoding provides data compression of variable length integer values that may occur between runs of zeros as may be typical in a very large, sparse matrix.

By way of non-limiting example, each value 203 may include multiple bytes 203 that may each include multiple bits 204. Although as illustrated herein, the byte length includes 8 bits, the invention is not so limited. For example, some embodiments include bytes that include more and/or less than 8 bits. Some embodiments provide that a size of bytes as used herein may be dependent on one or more characteristics of the data. For example, where the data includes substantially low counts, a byte size may be reduced to result in greater efficiency for such data. Further, some embodiments provide that counts may use variable byte length encoding to provide a virtually infinite size without experiencing data overflow.

Some embodiments provide that within each byte 203, "bit 1" 204B may define either a value type bit or a value bit as part of the remaining bits of the byte 203. In this regard, where "bit 0" 204A may always be a continuation bit, "bit 1" 204B may provide two different uses, depending on whether there is a continuation or not. Accordingly, when a new value is started (continuation ended in the last byte), then the new value type is provided by "bit 1" 204B. For example, if the continuation bit of the prior byte is a "1", then the "bit 1" 204B may be included with bits 2-7 as a value bit. If the continuation bit of the prior byte is "0", then a "bit 0" value of "0" may indicate the end of the current run with a value. Instead, if "bit 0" includes a value of "1" then the value is continued in the next byte.

Some embodiments provide that if the current run is ending with a value (prior bit 0=0), then "bit 1" 204B of the byte may indicate a value type. For example, if the value type is a "0", then a zero run length may be indicated, which provides that the rest of the bits in that byte are zero. In contrast, if the value type is "1", then an associative count may be indicated, which may provide that bits 2-7 in that byte may be a binary representation of an integer value using infinite integer encoding.

Figure 18:
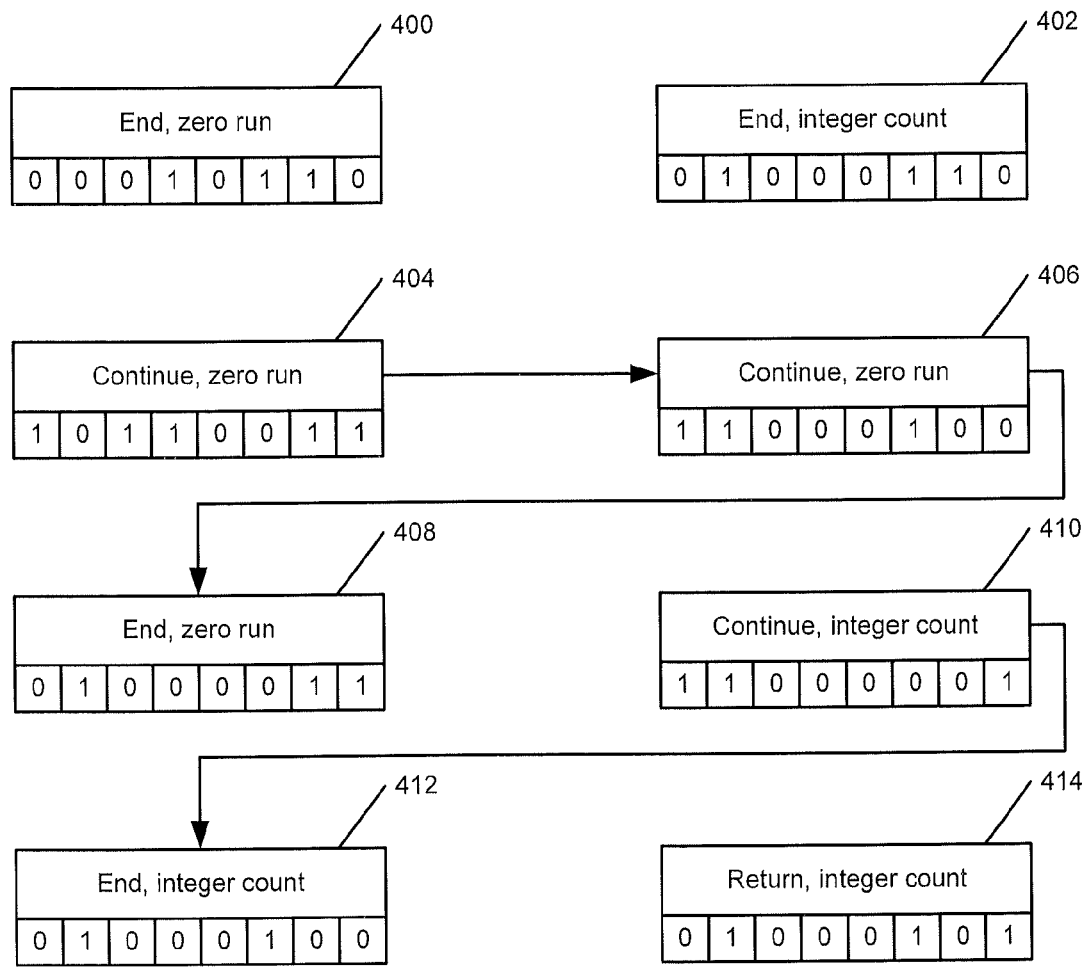
FIG. 18 is a block diagram illustrating an example of cell run encoding as described above regarding FIG. 17, according to some embodiments of the present invention.

Reference is now made to FIG. 18, which is a block diagram illustrating an example of cell run encoding as described above regarding FIG. 17, according to some embodiments of the present invention. The first byte 400 illustrated in this example, includes zeros in the first and second bits. Assuming a prior continue bit value of zero, the first bit zero value indicates that the current byte is ending the run with a value and the second bit zero value indicates that the value type is a zero run length. The numerical value corresponding to bits 2-7 is 22, which is added to the identifier (assumed to be zero initially) to generate the new identifier value, which is 22. Since this was a zero run, there is no corresponding count value.

The second byte 402 includes a zero and one in the first and second bits, respectively. The first bit zero value indicates that the current byte is ending the run with a value and the second bit one value indicates that the value type is an integer count. The integer value is the numerical value corresponding to bits 2-7 (000110), which is 6. The return identifier value of 22 is associated with the integer count value of 6. The identifier is incremented by one to become 23.

The third byte 404 includes a one and zero in the first and second bits, respectively. The first bit one value indicates that the current byte value will continue into the next byte and the second bit zero value indicates that the value type is a zero run. The bits in the remaining 2-7 bit positions (110011) are preserved to be concatenated with subsequently occurring bits until the zero run value is fully determined.

Continuing, the fourth byte 406 includes a one in each of the first and second bits. The first bit one value indicates that the current byte value will continue into the next byte. Since the prior continuation bit (third byte 404, first bit) is a one, then the value type is already determined as a zero run. In this regard, the second bit may be included in the value field. Accordingly, the bits in the remaining 1-7 bit positions (1000100) are concatenated with the value bits of the previous byte. Accordingly, the current value is the first value (110011) concatenated with the second value (1000100), or 1100111000100.

Still continuing, the fifth byte 408 includes a zero and one in the first and second bits, respectively. The first bit zero value indicates that the current byte is ending the run with a value. Since, as in the fourth byte 406, the prior continuation bit is one, then the remaining bits 1-7 (1000011) may be included in the value field. Accordingly, the new current value is the previous current value (1100111000100) concatenated with bits 1-7 (1000011) or 11001110001001000011, which is 1,688,710. This value is added to the previous identifier 23 to result in an identifier of 1,688,733.

The sixth byte 410 includes a one in each of the first and second bits. The first bit one value indicates that the current byte value will continue into the next byte. Since the prior continuation bit (fourth byte 406, first bit) is a zero, then the value type may be determined by the second bit. The second bit one value indicates that the current byte value will be an integer count value. Accordingly, the bits in the remaining 2-7 bit positions (000001) are preserved for concatenation with the value bits of the subsequent byte(s).

The seventh byte 412 includes a zero and one in the first and second bits, respectively. The first bit zero value indicates that the current byte is ending the run with a value. Since the prior continuation bit is one (fifth byte 410), then the remaining bits 1-7 (1000100) may be included in the value field. Accordingly, the new current value is the previous current value (000001) concatenated with bits 1-7 (1000100) or 0000011000100, which is 196. Since this value is an integer count, the return identifier value of 1,688,733 is associated with the integer count value of 196. The identifier is incremented by one to become 1,688,734.

Note that within the eight exemplary bytes described above, the non-zero data from identifier 0 through identifier 1,688,735 were determined and associated with their respective identifiers via the cell run encoding.

The eighth byte 414 includes a zero and one in the first and second bits, respectively. The first bit zero value indicates that the current byte is ending the run with a value. Since the previous byte did not have a continuation bit value of one, the second bit one value indicates that the value type is an integer count. The integer value is the numerical value corresponding to bits 2-7 (000101), which is 5. The return identifier value of 1,688,734 is associated with the integer count value of 5. The identifier is incremented by one to become 1,688,735.

Figure 19:
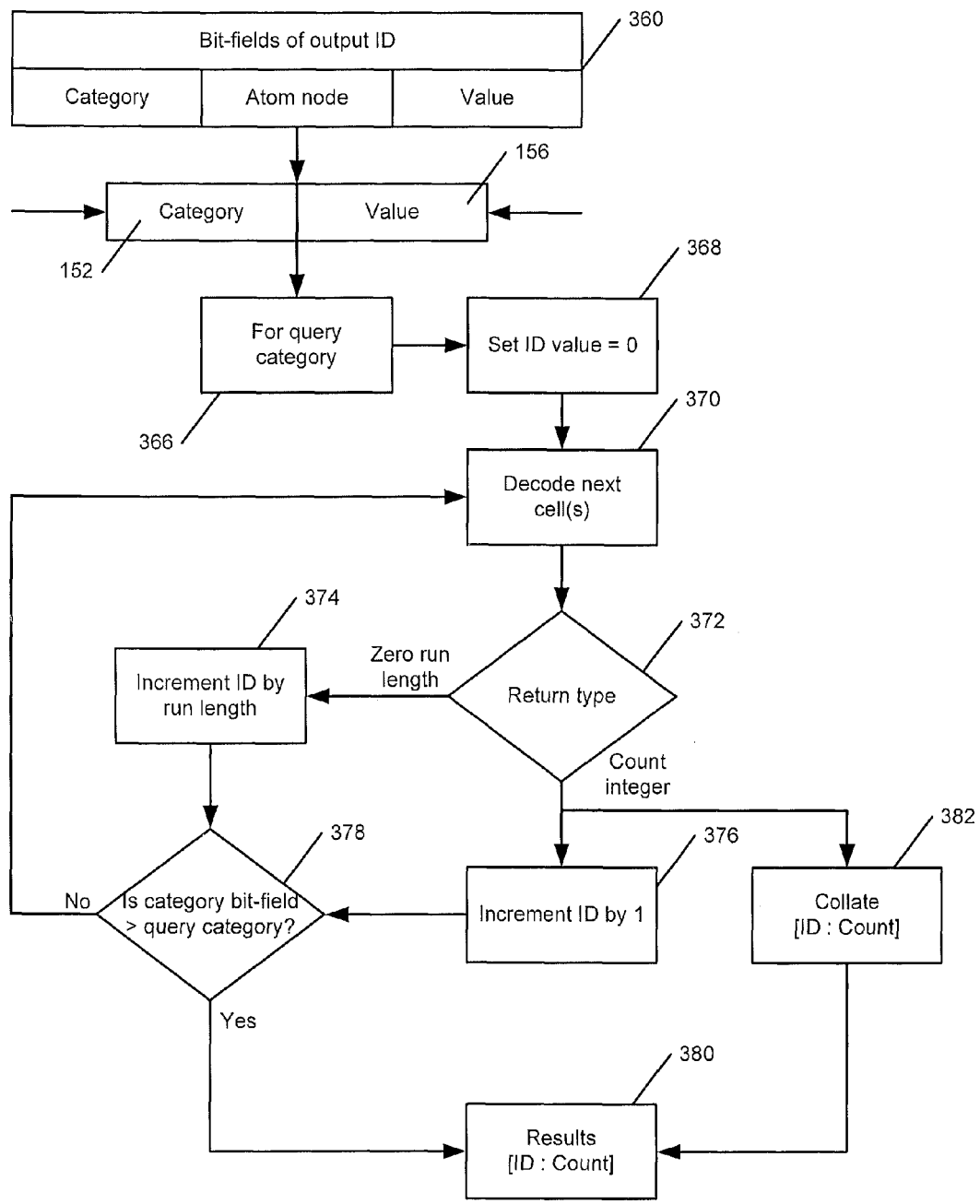
FIG. 19 is a flow chart illustrating operations for scanning an output category according to some embodiments of the present invention.

Reference is now made to FIG. 19, which is a flow chart illustrating operations for scanning an output category according to some embodiments of the present invention. Although the operations for scanning an output category may be more applicable to a large matrix as described above regarding FIG. 16, portions of the scanning operation may be applicable to the standard byte matrix as described above regarding FIG. 14. For every query output category, the bit-fields of the output identifier 360 include a category index field 362 and a value index field 364. As described above regarding FIG. 12, the output identifier, which may be referred to as a key value may originally include a category index field 152, an atom node field 154, and/or a value index field 156, among others. For the purposes of the scanning operations according to some embodiments, however, the atom node field 154 may be removed such that the category index 152 and the value index 156 may be combined to form an output identifier 360. Operations include, for each query category (block 366), initializing the scan by setting the output identifier value to zero (block 368).

The cell(s) corresponding to the output identifier 360 in that category is decoded (block 370) and the type of cell encoding is returned (block 372) in the instance of a large matrix. As a standard byte matrix may not use cell run encoding, a zero run length may not occur and thus the type of cell therein may be inapplicable. If the cell encoding is zero run length, then the output identifier 360 is incremented by the run length (block 374). By advancing the output identifier 360 to the end of the run of zeros, very large, sparse matrices may be processed in an efficient manner. If the cell encoding is an integer count, then the output identifier 360 is incremented by 1 (block 376) so that the next output identifier value may be evaluated.

As the category index 152 and the value index 156 are concatenated into a single value, once the output identifier 360 is incremented beyond the lower bits that are associated with the value index 156, the category index 152 will advance to a value that corresponds to the next query category. In this manner, once the category bit-field 152 is incremented beyond that corresponding to the query category (block 378), then the results are returned (block 380) and collated with the corresponding identifiers (block 382). If the category index is not greater than the query category, then the next cell is decoded (block 370). In this manner, all of the output identifiers 360 may be evaluated for each query category.

Figure 20:
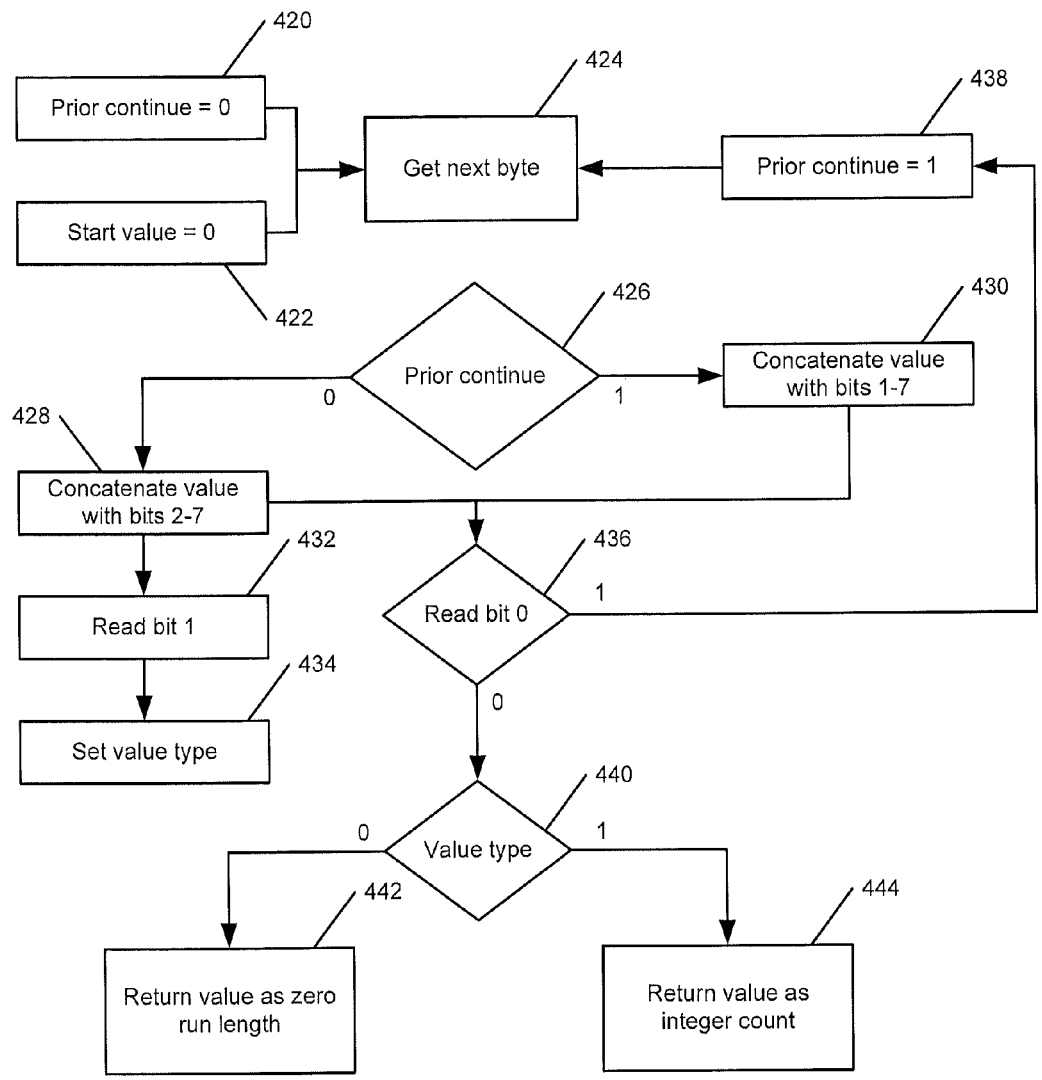
FIG. 20 is a flow chart illustrating operations of a cell run decoder as used in a large matrix according to some embodiments of the present invention.

Reference is now made to FIG. 20, which is a flow chart illustrating operations of a cell run decoder as used in a large matrix according to some embodiments of the present invention. In some embodiments, the cell run decoder may include a byte-by-byte decoder that may provide an integer count and/or a halting function corresponding to the decoding bytes that are encoded using the cell run encoding as described above regarding FIG. 17. Some embodiments provide that instead of fetching a stored identifier, an identifier value may be computed as described herein. In order to ensure that the starting point is not within a run length or integer count, the continue bit of the prior byte is zero (block 420) and the start encoded value is zero (block 422). The next byte is retrieved (block 424) and the prior continue bit is read (block 426). If the prior continue bit is zero then the encoding value is concatenated with bits 2-7 (block 428). Note that on the first byte (as indicated by the prior continue bit of zero), the second bit (bit 1) is read to determine the value type (block 432) and the value type is set (block 434).

After the concatenation (block 428), the first bit (bit 0) is read (block 436) to determine whether or not subsequent bytes are necessary to determine the final encoded value. In this regard, the first bit may be a continuation bit signaling that a subsequent byte is a continuation of the current byte. If the first bit (bit 0) is one then that becomes the new prior continue bit (block 438) and the next byte is retrieved (block 424). If first bit (bit 0) is zero, then the value type is determined by reading the second bit (bit 1) (block 440). A zero value at the second bit indicates a zero run length and the encoded value is returned as such (block 442). A one value at the second bit indicates an integer count and the encoded value is returned as such (block 444).

In the alternative, if the prior continue bit is one then the byte is a continuation of the previous byte and thus the value type is already known. Accordingly, the prior continue bit is one (block 426) and the value type is known by via a previously decoded byte. In this regard, as the value type is known, the second bit may be included in the value field and the encoded value may be concatenated with bits 1-7 (block 430).

In some embodiments, the value being accumulated includes a pointer and/or a form of a pointer to a next non-zero data location. In some embodiments, the value being accumulated includes an integer that represents a count and may be encoded using an infinite integer encoding. In either instance, a virtually limitless field length via the above described encoding may provide a virtually infinite value size without data overflow. In some embodiments, the encoding described herein may be considered as a variable word size linked list that provides a pointer into identifier space.

Figure 21:
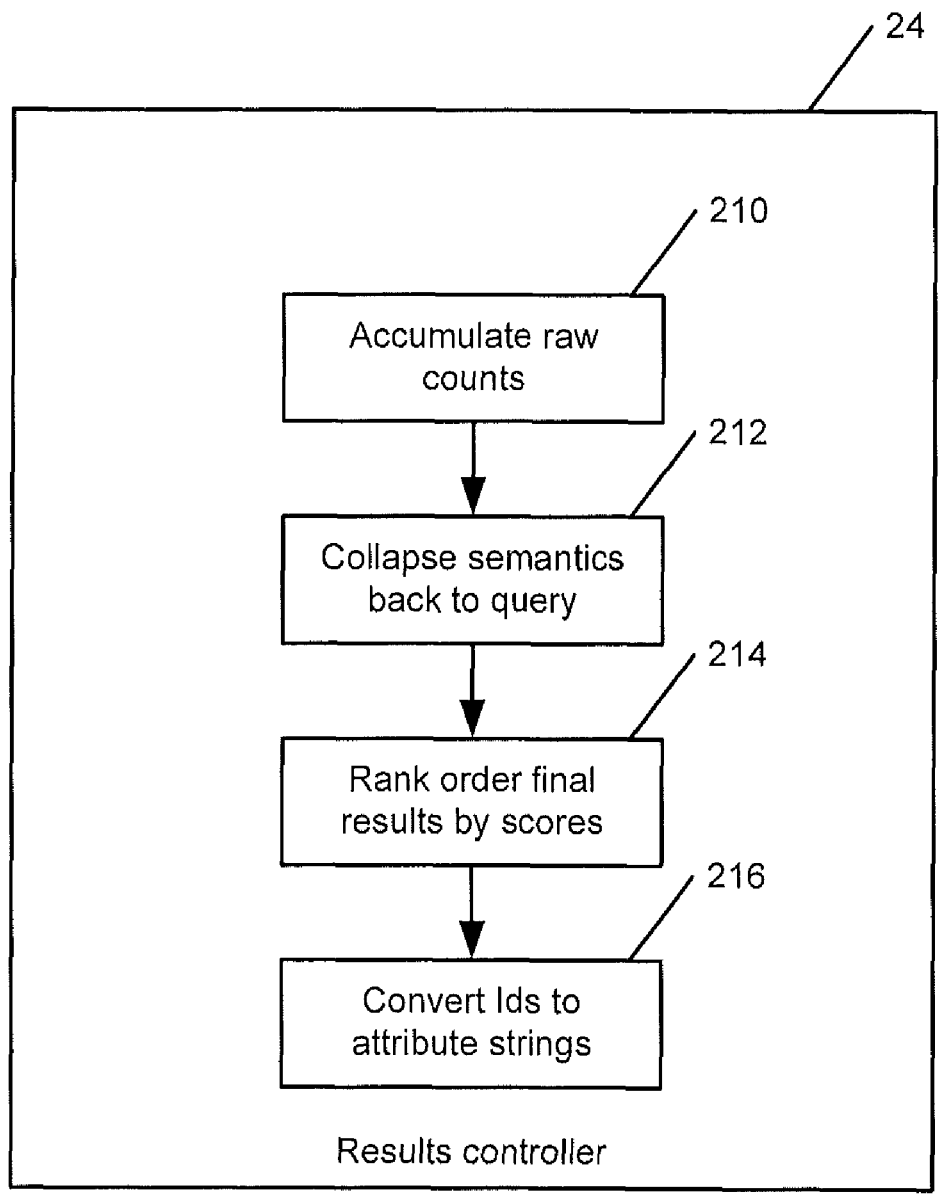
FIG. 21 is a flow chart illustrating an overview of operations in a results controller according to some embodiments of the present invention.

Reference is now made to FIG. 21, which is a flow chart illustrating an overview of operations in a results controller 24 as illustrated in FIG. 2, according to some embodiments of the present invention. The raw count data is accumulated from the row queues (block 210). In some embodiments, the raw count data includes column identification and a corresponding count value. Some embodiments provide that the column identification and corresponding count value may be defined in terms of the physical space of the data location. The semantics may be collapsed back to the query to express the return column identifier and count data in the query terms (block 212).

Some embodiments provide that the final results are rank ordered (block 214). In some embodiments, scoring the final results may be performed to provide information regarding relative relevance among the data. For example, in the context of time slices, newer data may be considered to be more relevant than older data. In this regard, the results may be weighted independently to capture the relative relevance among data. For example, in addition to the triple stores of associations, the counts also serve to provide frequency information, which may be captured in the final results by weighting associations having greater frequencies of occurrence more heavily than those having fewer frequencies of occurrence.

The identifiers are converted to attribute strings (block 216). Some embodiments provide that, by waiting until after the ranking and/or scoring, the converted queue stream is provided in a predictable order that is consistent with the relative importance in terms of the query.

Figure 22:
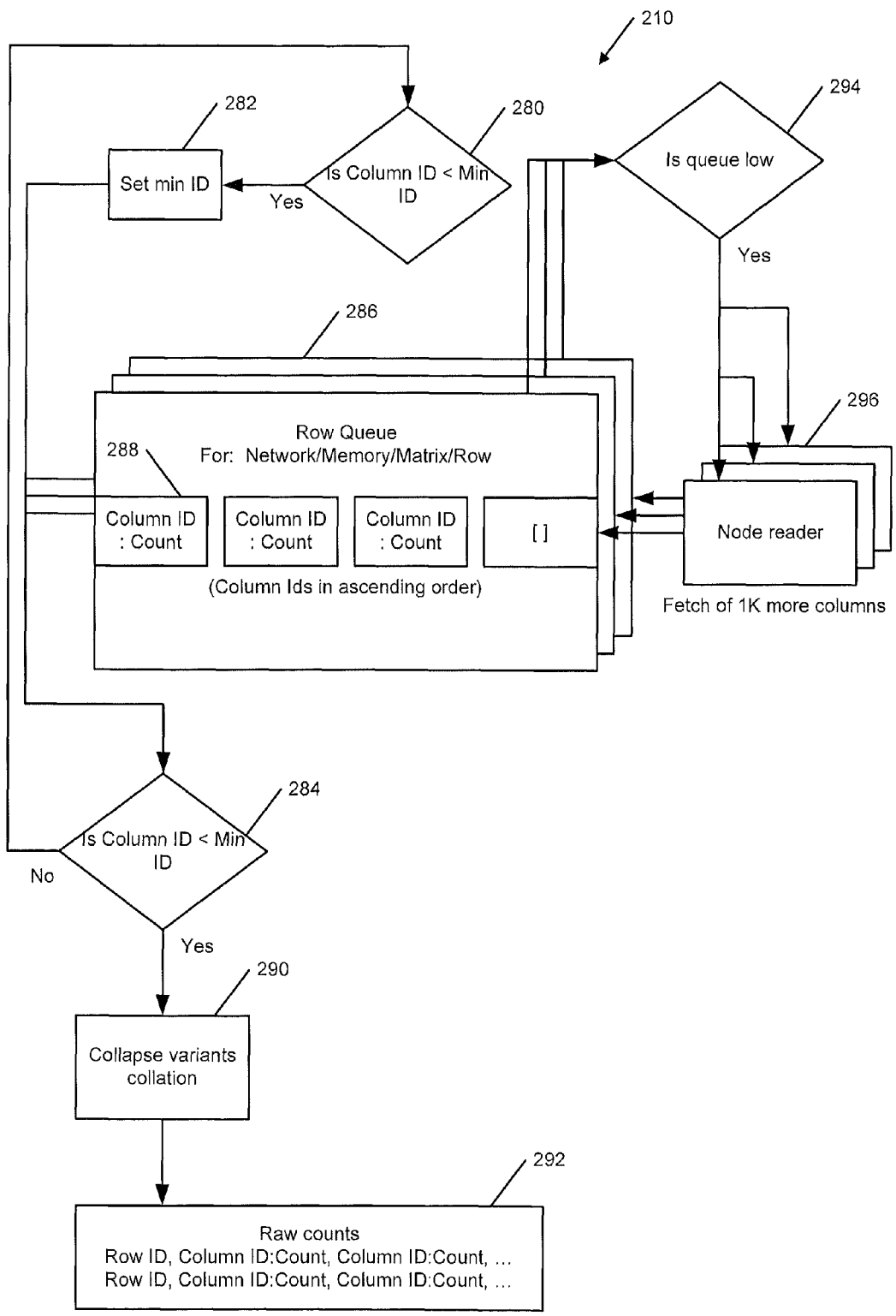
FIG. 22 is a flow chart illustrating operations for accumulating raw counts according to some embodiments of the present invention.

Reference is now made to FIG. 22, which is a flow chart illustrating operations for accumulating raw counts 219 as described above regarding FIG. 21, according to some embodiments of the present invention. Whether originating from a byte matrix or from a large matrix, a series of column identifiers and the corresponding count data are provided back to the row queues. In some embodiments, the column identifiers corresponding to each row queue may be provided in a predefined order. For example, the column identifiers may be arranged in an ascending order. By providing a predefined order based on the column identifier, the organizational scheme of the matrix may define relationships among the data that may be preserved. For example, a column identifier may provide that a first high bit value field of the identifier describes an attribute type (category) and a second low bit value field describes the attribute value (value) to describe the category:value. When reading the ordered returned data, once the category field advances to a new type, it can be deduced that all of the values corresponding to that the previous attribute type have been read.

The row queues 286 that may be generated by binding the each of the network:memory:matrix:row query items, as described in namespace, may be matched to queue resources that may be streamed responsive to requests for count data and/or satisfaction thereof. For example, when the amount of data within a queue and/or the number of queues being processed is low and/or below a defined threshold (block 294) then one or more of the node readers 296 may fetch more columns and/or counts from the corresponding rows. Some embodiments provide that the column and count data is fetched via the node reader 296 in a streaming manner and fed into the corresponding row queues 286 as it is fetched. The column identifier:count data may continue to be fed into a row queue 286 until the node reader 296 indicates that the requested data has been provided. In this manner, the data may be continually processed in a manner that may avoid overwhelming processing resources.

Note that the column identifier:counts 288 may be provided and/or arranged in the row queues 286 in a predefined order relating to the column identifier. In some embodiments, the column identifier:counts 288 may be arranged in ascending order of the column identifiers. Some embodiments provide that the column identifier:counts 288 are sorted by virtue of the arrangement of data in a byte matrix and/or a large matrix tree. For example, the arrangement of the data in the matrices identifies the non-zero portions within very large, sparse matrices that are substantially unpopulated. In some embodiments, the arrangement of data provides additional richness in that related categories of data may be co-located. Accordingly, the column identifier may be semantically significant. In this manner, the organization of the associative memory base may directly contribute to the speed and flexibility of the exploitation thereof.

Some embodiments provide that if the column identifier is less than a minimum column identifier value (block 280) of the pending row queues 286 then that column identifier is set as the minimum identifier (block 282). Stated differently, the operations may function as a column identifier iterator to retrieve the column identifier:count data from the row queues 286 in an order starting from the minimum column identifier value that is in the row queues. The column identifier:count data for those of the row queues 286 that corresponds to the minimum identifier value is retrieved and, if applicable, may be collapsed with variants of that column identifier:count to collate the related counts (block 290). In this manner, the raw counts 292 may be accumulated (block 292).

Figure 23:
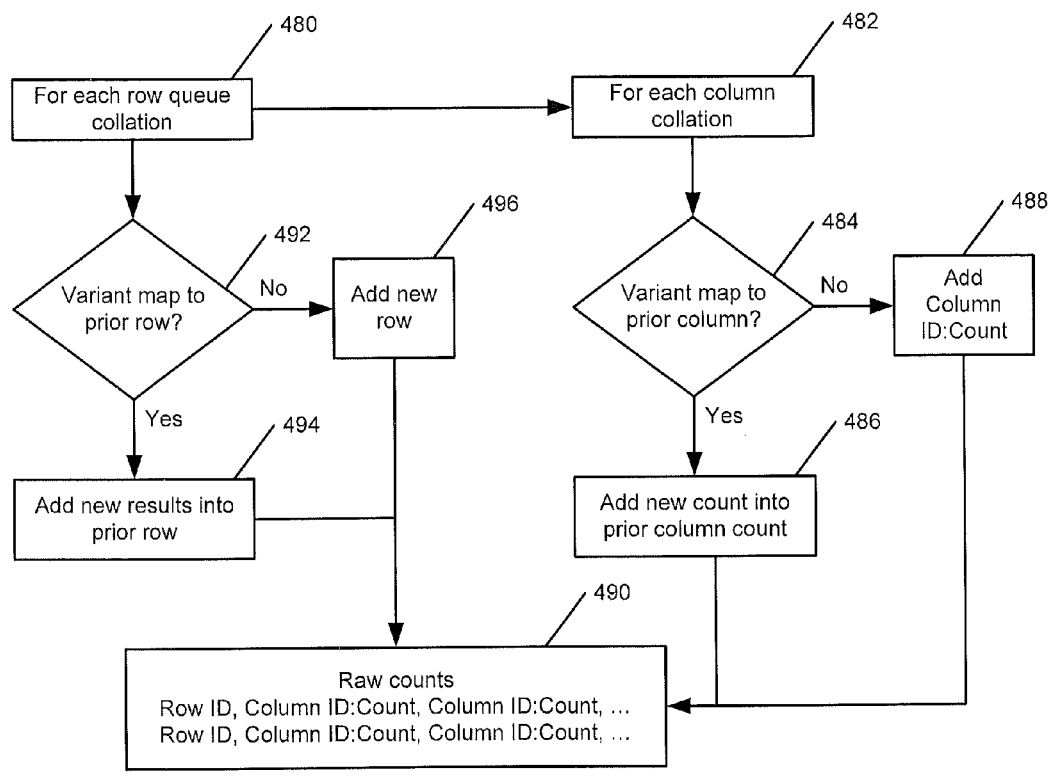
FIG. 23 is a flow chart illustrating operations for a variant collapse according to some embodiments of the present invention.

As described above regarding FIG. 7, the subcube of selected matrices may be expanded as variant expansions. Now that the query results corresponding to the expanded variants have been returned, reference is now made to FIG. 23, which is a flow chart illustrating operations for a variant collapse according to some embodiments of the present invention. As the variants are generally considered to be equivalents, count information corresponding to variants of a query term may be additive. For example, where variants of a query term "Joseph" may include "Joe" and "Joey", the raw count data corresponding to "Joseph", "Joe", and "Joey" may be summed to collapse the previously expanded variants.

Operations according to some embodiments may provide that for each row queue collation (block 480), a determination may be made as to whether the variant maps to the prior row (block 492). If the variant maps to the prior row, then the new results are added to those of the prior row (block 494) in the raw counts (block 490). The raw counts (block 490) may be stored as column identifier:count data corresponding to each row identifier. For example, the raw counts may be provided as "Row identifier, column identifier:count, column identifier:count, . . . " If the variant does not map to the prior row, and then a new row is added (block 496) to the raw counts (block 490).

For each column collation within each row queue collation (block 482), a determination may be made as to whether the variant maps to a prior column (block 484). As the variants are treated additively, a count for a variant that maps to a prior column is added to the count of the prior column (block 486) in the raw counts (block 490). If the variant does not map to a prior column, then the column identifier: is added (block 488) to the raw counts (block 490).

Figure 24:
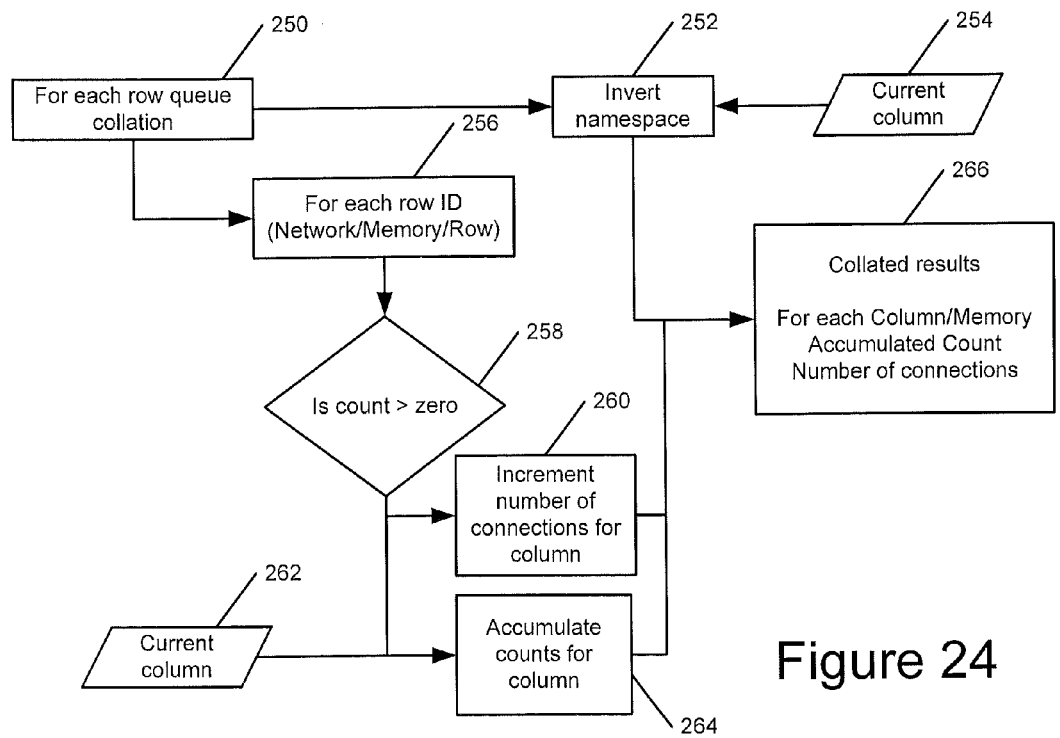
FIG. 24 is a flow chart illustrating operations for accumulating raw results according to some embodiments of the present invention.

After the variants are collapsed, as described above regarding FIG. 23, the raw results may be accumulated, as described in reference to FIG. 24, which is a flow chart illustrating operations for accumulating raw results according to some embodiments of the present invention. Operations for accumulating raw results may provide a synchronization of the data coming from the row queues with respect to each column identifier. In some embodiments, for each column step (block 250), and for each row identifier (Network:Memory:Row) (block 256), if the count is greater than zero (block 258), then the current count (block 262) for that column is accumulated with other counts for that column (block 264). Additionally, in some embodiments, the number of connections for that column is incremented (block 260) to maintain the number of connections that correspond to the accumulated count in the collated results (block 266).

Some embodiments provide that the namespace for the current column (block 254) is inverted (block 252) and including in the collated results (block 266). Inverting the namespace may provide an answer oriented collation. For example, where the original namespace was defined based on increasing granularity, the inverted namespace may be column oriented. In this regard, the collated raw result may provide a row count and a number of connections for every "Column:Row:Memory:Network".

Further, the expansion and collapse of the variants, as discussed above regarding FIG. 23, represent one example of a Boolean structure that may be applied to the input query. In this regard, some embodiments provide that the input query may include one or more types of Boolean structure, which may be expanded and/or collapsed before and/or after, respectively, retrieving the raw counts. Accordingly, in some embodiments, the Boolean specification of the query may be applied to the interpretation of the row counts. In this manner, Boolean satisfaction may be used to process input queries including varying levels of logical complexity to extract the richness of the distributed associative memory base relative to the query logic.

Figure 25:
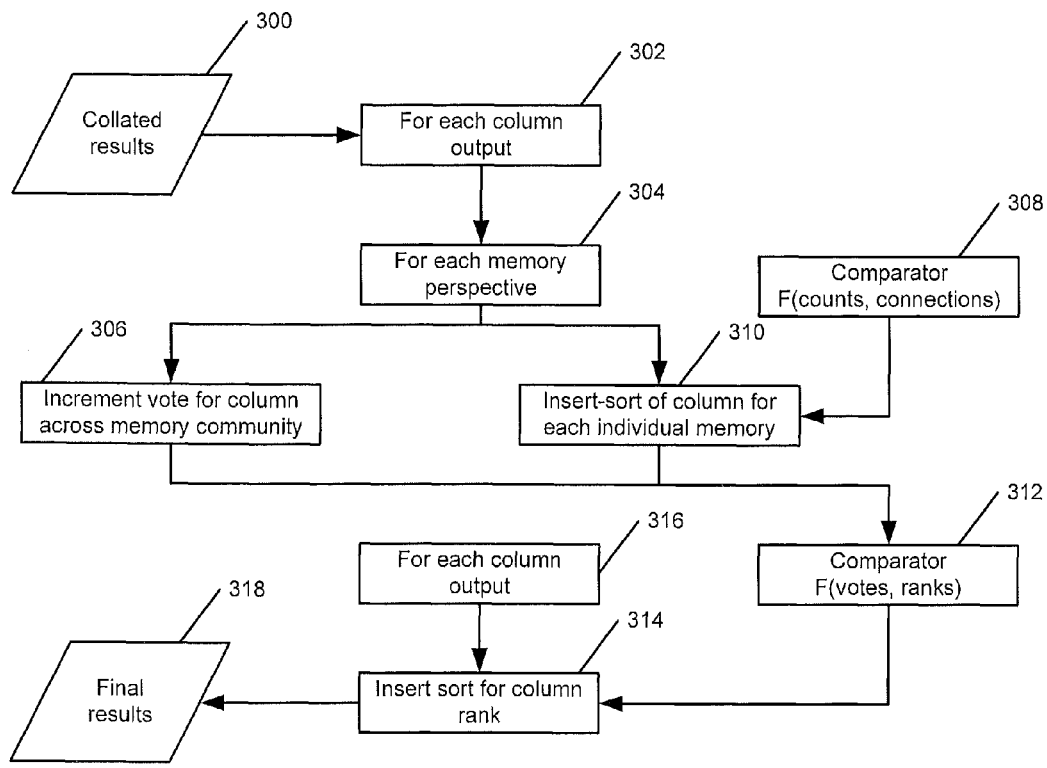
FIG. 25 is a flow chart illustrating operations for providing rank order results according to some embodiments of the present invention.

Reference is now made to FIG. 25, which is a flow chart illustrating operations for providing rank order results, as discussed above regarding FIG. 21, according to some embodiments of the present invention. Rank order operations on collated results (block 300) may be performed for each memory perspective (block 304) for each column output (block 302). In some embodiments, operations on each of the column/memory perspective combination may include incrementing a vote for each column across the memory community (block 306). The vote may correspond to a non-zero value and may be provided as a temporary result that provides a measure of connectedness. For example, the vote may represent a semantic existence of the connection. Some embodiments provide that each non-zero column/memory result includes one vote.

Using a comparator function (block 308) that may compare collated results in terms of counts and connections, a sort of the columns is inserted for each individual memory (block 310). A comparator function (block 312) that may compare the votes and column sorted ranks may provide an overall column rank (block 314) corresponding to each column output (block 316) to provide rank ordered final results (block 318).

Figure 26:
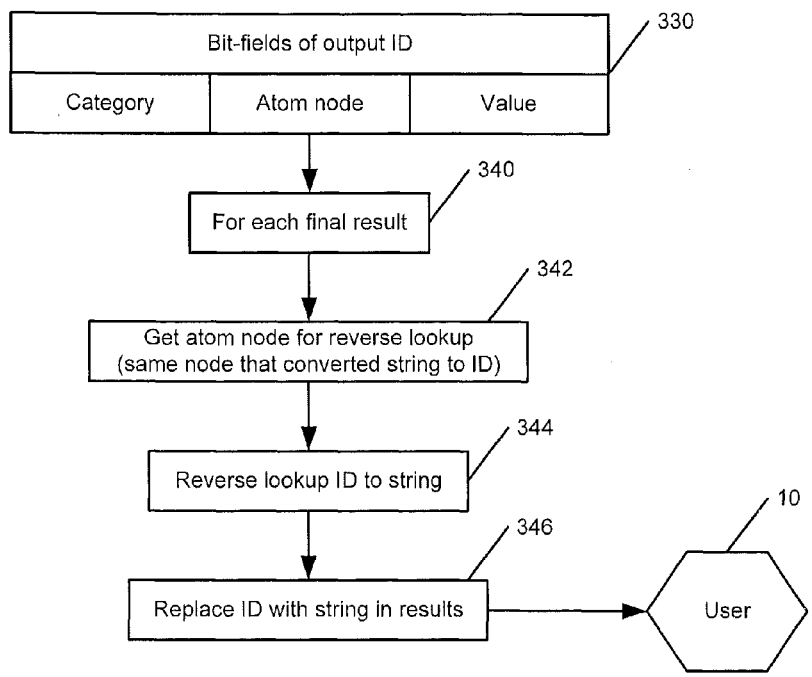
FIG. 26 is a flow chart illustrating operations for converting output identifiers to namespace strings according to some embodiments of the present invention.

Reference is now made to FIG. 26, which is a flow chart illustrating operations for converting output identifiers to namespace strings, as discussed above regarding FIG. 21, according to some embodiments of the present invention. As described above regarding FIG. 11, the output identifiers may include fields corresponding to category, atom table node and value. For each final result output identifier (block 340), the atom node is determined for a reverse lookup (block 342). A reverse lookup is performed to determine the query string name that corresponds to the output identifier (block 344). The query string name is used to replace the output identifier (block 346).

Figure 27:
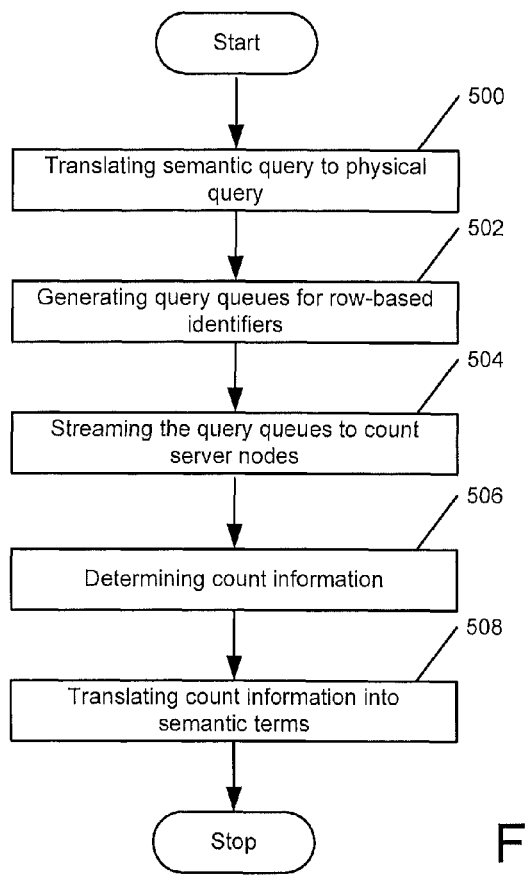
FIG. 27 is a flow chart illustrating operations for querying a distributed associative memory base according to some embodiments of the present invention.

Reference is now made to FIG. 27, which is a flow chart illustrating operations for querying a distributed associative memory base according to some embodiments of the present invention. A semantic-space based query that is received from a user is translated into a physical-space based query (block 500). Some embodiments provide that the physical-space based query that is expressed as multiple row-based identifiers that correspond to respective physical memory locations in at least one of multiple associative memory networks in the distributed associative memory base.

Multiple query queues that correspond to the row-based identifiers may be generated (block 502). The query queues may be streamed to multiple count server nodes that correspond to the associative memory networks (block 504). Count information responsive to the query queues may be determined from the node servers (block 506). Count information from the node servers may be translated into semantic-space based result information that is responsive to the semantic-space based query.

Figure 28:
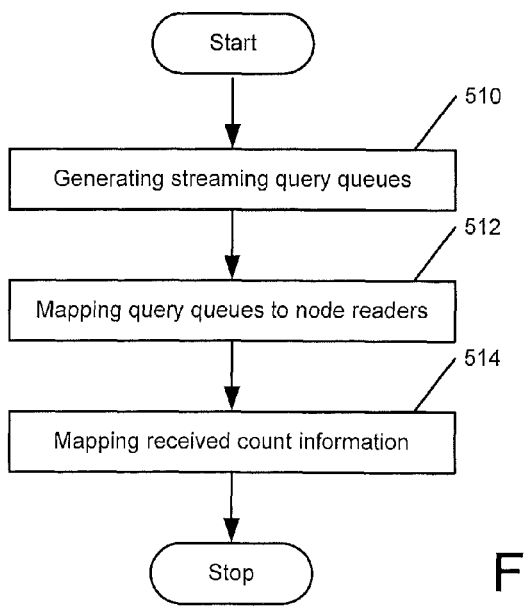
FIG. 28 is a flow chart illustrating operations for using a distributed associative memory base according to some embodiments of the present invention.
Figure 29:
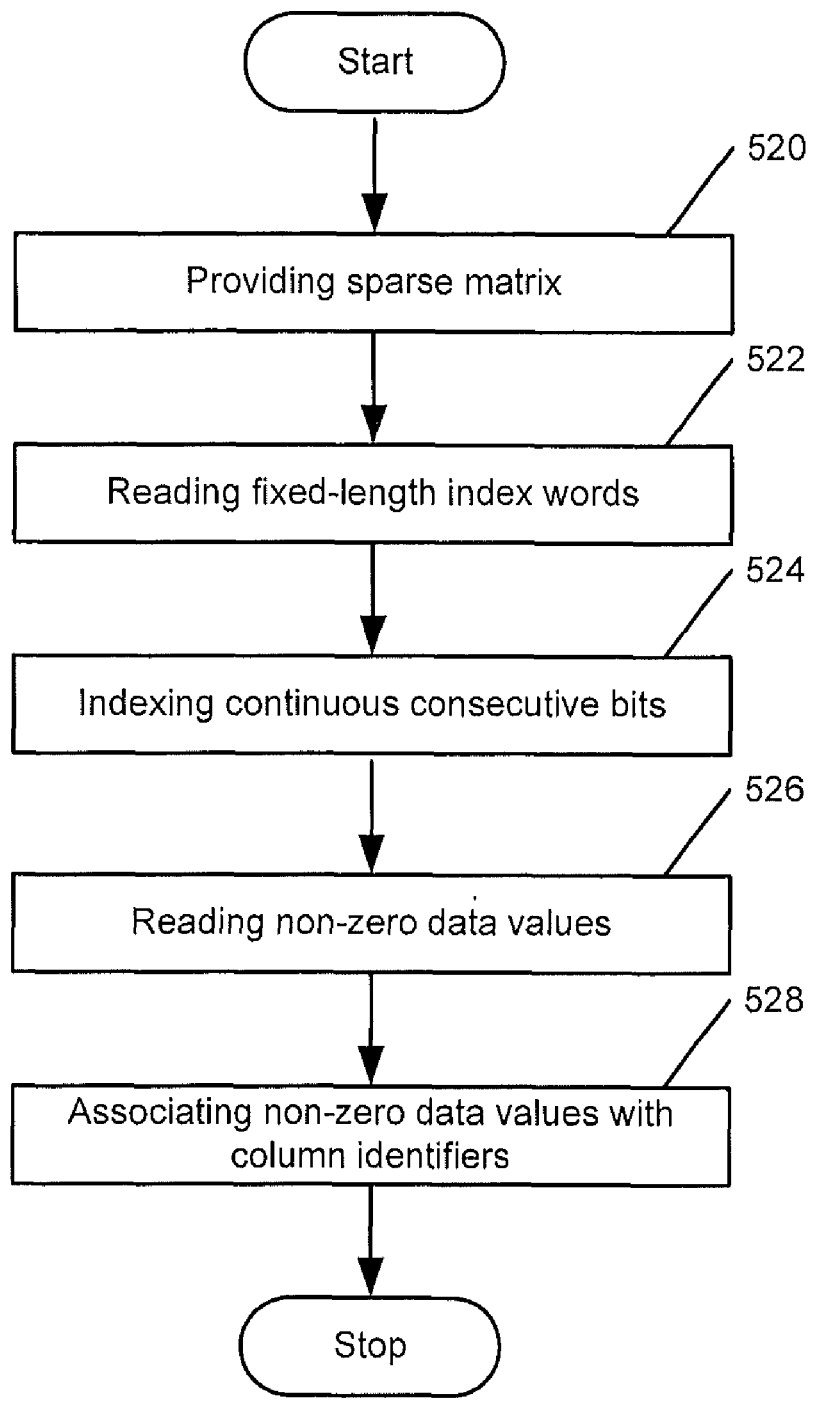
FIG. 29 is a flow chart illustrating operations for encoding data in a large sparse matrix according to some embodiments of the present invention.

Reference is now made to FIG. 28, which is a flow chart illustrating operations for using a distributed associative memory base according to some embodiments of the present invention. Multiple streaming query queues that correspond to a physical-space based query may be generated (block 510). In some embodiments, the streaming query queues may be expressed as a multiple row-based identifiers of respective physical memory locations in at least one of multiple distributed associative memory networks.

Some embodiments include mapping ones of the streaming query queues to multiple node readers that are operable to receive count information from multiple count server nodes that correspond to the distributed associative memory networks (block 512). The received count information may be mapped back to corresponding ones of the streaming query queues (block 514).

Reference is now made to FIG. 28, which is a flow chart illustrating operations for encoding data in a large, sparse matrix according to some embodiments of the present invention. A sparse matrix that includes non-zero data locations that are identified by row identifier and column identifier values may be provided (block 520). Fixed-length encoded matrix index words may be read (block 522). For a given row in a sparse matrix, continuous consecutive bits having zero value may be indexed by providing encoded index offset values having variable word lengths in at least one fixed-length encoded matrix index word (block 524). Variable word length non-zero data values may be read from at least one fixed-length encoded matrix index word (block 526). Variable word length non-zero data values may be associated with corresponding column identifiers (block 528).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An associative memory system, comprising:
a distributed associative memory base comprising a network of networks of associative memory networks, a respective associative memory network comprising associations among a respective observer memories and a plurality of observed memories that are observed by the respective observer memory, ones of the associative memory networks are physically and/or logically independent from other ones of the associative memory networks; and
a processing system that is configured to observe associations into, and imagine associations from, the distributed associative memory base using a plurality of streaming queues that correspond to respective ones of a plurality of rows in the associative memory networks,
wherein the processing system further comprises a plurality of count server nodes that are configured to receive requests from the plurality of streaming queues and to provide count data that corresponds to associations in the distributed associative memory base responsive to the received requests.

2. The associative memory system of claim 1, wherein ones of the plurality of streaming queues correspond to one of a plurality of physical locations in the associative memory networks.

3. The associative memory system of claim 1, wherein the processing system further comprises a query map that is configured to translate a semantic-space based query that is received from a user into a physical-space based query that is expressed as a plurality of row-based identifiers corresponding to a plurality of physical memory locations in the associative memory networks and that is included in at least one of the plurality of streaming queues.

4. The associative memory system of claim 3, further comprising an ontology that is configured to be accessed by the query map to estimate taxonomic meanings corresponding to the semantic-space based query to provide query terms that correspond to a physical representation of the associative memory networks.

5. The associative memory system of claim 3,
wherein the query map is further configured to identify one or more variants of the plurality of query terms in the semantic-space based query and/or the physical-space based query and to expand the physical-space based query to include the one or more variants, and
wherein the one or more variants include synonyms, aliases and/or acronyms corresponding to ones of the plurality of query terms.

6. The associative memory system of claim 1, wherein the processing system further comprises a plurality of atom tables that are configured to provide a matrix row identification responsive to receiving a physical-space based query in a corresponding one of the plurality of streaming queues received by one of the plurality of count server nodes,
wherein the plurality of atom tables are further configured to provide reverse look-up data to associate returned results from the associative memory networks with the physical-space based query.

7. A computer program product comprising a non-transitory computer usable storage medium having computer-readable program code embodied in the medium, the computer-readable program code comprising computer-readable program code that is configured to provide the distributed associative memory base and/or the processing system of claim 1.

8. An associative memory system, comprising:
a distributed associative memory base comprising a network of networks of associative memory networks, a respective associative memory network comprising associations among a respective observer memories and a plurality of observed memories that are observed by the respective observer memory, ones of the associative memory networks are physically and/or logically independent from other ones of the associative memory networks; and
a processing system that is configured to observe associations into, and imagine associations from, the distributed associative memory base using a plurality of streaming queues that correspond to respective ones of a plurality of rows in the associative memory networks,
wherein the processing system further comprises a query map that is configured to translate a semantic-space based query that is received from a user into a physical-space based query that is expressed as a plurality of row-based identifiers corresponding to a plurality of physical memory locations in the associative memory networks and that is included in at least one of the plurality of streaming queues,
wherein the query map comprises at least one of a plurality of mapping policies that correspond to different ones of a plurality of query terms in the semantic-space based query and/or the physical-space based query,
wherein the plurality of mapping policies define policies including rank and/or recency, and
wherein the query map is further configured to modify the physical-space based query corresponding to the rank and/or recency policies.

9. An associative memory system, comprising:
a distributed associative memory base comprising a network of networks of associative memory networks, a respective associative memory network comprising associations among a respective observer memories and a plurality of observed memories that are observed by the respective observer memory, ones of the associative memory networks are physically and/or logically independent from other ones of the associative memory networks;
a processing system that is configured to observe associations into, and imagine associations from, the distributed associative memory base using a plurality of streaming queues that correspond to respective ones of a plurality of rows in the associative memory networks; and
a results controller that is configured to receive count data corresponding to the associations in the distributed associative memory base and to resynthesize the count data with semantic-space based namespace to provide results to a user.

10. The associative memory system of claim 9, wherein the results controller is further configured to accumulate raw count data corresponding to ones of the plurality of streaming queues, to collapse related ones of a plurality of physical-space based query terms and corresponding raw count data using an ontology that was accessed by a query map, to rank order count data of collapsed physical-space based query terms, and to convert physical-space based results into semantic-space based results.

11. The associative memory system of claim 9, wherein ones of the plurality of streaming queues correspond to one of a plurality of physical locations in the associative memory networks.

12. The associative memory system of claim 9, wherein the processing system further comprises a query map that is configured to translate a semantic-space based query that is received from a user into a physical-space based query that is expressed as a plurality of row-based identifiers corresponding to a plurality of physical memory locations in the associative memory networks and that is included in at least one of the plurality of streaming queues.

13. The associative memory system of claim 12, further comprising an ontology that is configured to be accessed by the query map to estimate taxonomic meanings corresponding to the semantic-space based query to provide query terms that correspond to a physical representation of the associative memory networks.

14. The associative memory system of claim 12,
wherein the query map is further configured to identify one or more variants of the plurality of query terms in the semantic-space based query and/or the physical-space based query and to expand the physical-space based query to include the one or more variants, and
wherein the one or more variants include synonyms, aliases and/or acronyms corresponding to ones of the plurality of query terms.

15. A method of querying a distributed associative memory base, the method comprising:
translating a semantic-space based query that is received from a user into a physical-space based query that is expressed as a plurality of row-based identifiers corresponding to a plurality of physical memory locations in at least one of a plurality of associative memory networks in the distributed associative memory base;
generating a plurality of query queues that correspond to the plurality of row-based identifiers;
streaming the plurality of query queues to a plurality of count server nodes that correspond to the plurality of associative memory networks;
determining count information responsive to the plurality of query queues from the plurality of count server nodes; and
translating the count information from the plurality of count server nodes into semantic-space based result information that is responsive to the semantic-space based query.

16. The method of claim 15, wherein translating a semantic-space based query comprises:
for each query term in the semantic-space based query, expanding the query term to include variants of the query term and the query term;
for each query term in the semantic-space based query, determining if a taxonomic map that includes taxonomic terms that correspond to the query term exists; and
if the taxonomic map exists, expanding the query term to include taxonomic terms and the query term.

17. The method of claim 15, wherein generating the plurality of query queues that correspond to the plurality of row-based identifiers comprises, for each of the plurality of row-based identifiers, binding a queue resource to define a row queue, wherein the queue resource includes one of a plurality of queue resources available to be bound to a row-based identifier.

18. The method of claim 15, wherein streaming the plurality of query queues to a plurality of count server nodes comprises mapping one or more of the plurality of query queues to a respective one of a plurality of node readers, wherein each of the plurality of node readers corresponds to a respective one of the plurality of count servers.

19. The method of claim 18, wherein ones of the plurality of node readers are configured to perform batch requests that correspond to multiple ones of the plurality of query queues to respective ones of the count servers.

20. The method of claim 15, wherein streaming the plurality of query queues to a plurality of count server nodes comprises mapping the plurality of query queues to a plurality of node readers in a many-to-many interface between the plurality of query queues and the plurality of node readers.

21. The method of claim 15, wherein determining count information responsive to the plurality of query queues from the plurality of count server nodes comprises determining, for ones of a plurality of query terms, a matrix identifier value that corresponds to matrix address data.

22. The method of claim 21, wherein determining, for ones of the plurality of query terms, the matrix identifier value that corresponds to matrix address data comprises:
determining atom table identification data to determine which of a plurality of atom table nodes includes the matrix identifier value;
determining respective identification data corresponding to respective ones of the plurality of the query terms; and
converting the respective identification data into the matrix identifier.

23. The method of claim 22, wherein determining the atom table identification data is performed using a look-up operation.

24. The method of claim 22, wherein determining the atom table identification data is performed using a computational method.

25. The method of claim 22, further comprising looking up a root page address of a root page of an encoded matrix that corresponds to the matrix identifier, wherein the root page includes a matrix type value that identifies an encoding type of the encoded matrix.

26. The method of claim 15, wherein translating the count information from the plurality of count server nodes into semantic-space based result information that is responsive to the semantic-space based query comprises:
accumulating raw count data from the plurality of query queues;
collapsing previously expanded variants and taxonomic terms and respective counts of each query term in the physical-space based query;
rank ordering collapsed query terms to provide relevance information of the query terms relative to one another corresponding to relative values of count data; and
converting the physical-space based query terms into semantic-space based query terms.

27. An associative memory method comprising:
providing a distributed memory base, comprising:
a network of associative memory networks, a respective associative memory network comprising associations among a respective observer entity and a plurality of observed entities that are observed by the respective observer entity, ones of the associative memory networks are physically and/or logically independent from other ones of the associative memory networks; and imagining associations from the associative memory base using a plurality of streaming queues that correspond to ones of a plurality of rows of ones of the associative memory networks, wherein imagining associations from the associative memory base comprises:

translating a semantic-space based query that is received from a user into a physical-space based query that is expressed as a plurality of row-based identifiers corresponding to a plurality of physical memory locations in at least one of associative memory networks in the associative memory base; and generating the plurality of streaming queues that correspond to the plurality of row-based identifiers.

28. An associative memory method comprising:

providing a distributed memory base, comprising:
 a network of associative memory networks, a respective associative memory network comprising associations among a respective observer entity and a plurality of observed entities that are observed by the respective observer entity, ones of the associative memory networks are physically and/or logically independent from other ones of the associative memory networks; and imagining associations from the associative memory base using a plurality of streaming queues that correspond to ones of a plurality of rows of ones of the associative memory networks, wherein imagining associations from the associative memory base comprises determining count information responsive to the plurality of streaming queues from a plurality of count server nodes that correspond to respective ones of associative memory networks in the associative memory base.

29. The associative memory method of claim 28, wherein imagining associations from the associative memory base comprises translating associative count information from the plurality of count server nodes into semantic-space based result information that is responsive to the semantic-space based query received from the user.

* * * * *